United States Patent
Baker et al.

(10) Patent No.: US 10,748,449 B2
(45) Date of Patent: Aug. 18, 2020

(54) MEDICAMENT DELIVERY TRAINING DEVICE

(71) Applicants: Jeff Baker, Orlando, FL (US); Mark Bunker, Orlando, FL (US); Paul van der Pol, Winter Garden, FL (US)

(72) Inventors: Jeff Baker, Orlando, FL (US); Mark Bunker, Orlando, FL (US); Paul van der Pol, Winter Garden, FL (US)

(73) Assignee: Noble International, Inc., Orlando, FL (US)

( * ) Notice: Subject to any disclaimer, the term of this patent is extended or adjusted under 35 U.S.C. 154(b) by 845 days.

(21) Appl. No.: 13/650,676

(22) Filed: Oct. 12, 2012

(65) Prior Publication Data
US 2013/0266919 A1  Oct. 10, 2013

Related U.S. Application Data

(60) Provisional application No. 61/620,168, filed on Apr. 4, 2012.

(51) Int. Cl.
*G09B 19/00* (2006.01)
*G09B 23/28* (2006.01)

(52) U.S. Cl.
CPC ........... *G09B 23/285* (2013.01); *G09B 19/00* (2013.01)

(58) Field of Classification Search
CPC ....................................................... G09B 5/06
USPC ........................................................ 434/262
See application file for complete search history.

(56) References Cited

U.S. PATENT DOCUMENTS

| | | | |
|---|---|---|---|
| 6,997,906 B2 | 2/2006 | Langley et al. | |
| 7,704,231 B2 | 4/2010 | Pongpairochana et al. | |
| 7,740,612 B2 | 6/2010 | Hochman | |
| 7,922,699 B2 † | 4/2011 | Baba | |
| 8,088,096 B2 | 1/2012 | Lauchard et al. | |
| 8,105,283 B2 | 1/2012 | Perriere | |
| 9,443,445 B2 | 9/2016 | Laurusonis et al. | |
| 2008/0059133 A1* | 3/2008 | Edwards et al. | G09G 7/48 703/7 |
| 2008/0160492 A1* | 7/2008 | Campbell | G09B 5/06 434/379 |
| 2010/0160894 A1† | 6/2010 | Julian et al. | |
| 2012/0253314 A1 | 10/2012 | Harish et al. | |
| 2013/0068641 A1† | 3/2013 | Puglisi | |

FOREIGN PATENT DOCUMENTS

WO   2010/046319 B1 †   4/2010

* cited by examiner
† cited by third party

*Primary Examiner* — James B Hull
(74) *Attorney, Agent, or Firm* — Timothy H. Van Dyke; Beusse, Wolter, Sanks & Maire PLLC

(57) ABSTRACT

In one embodiment herein a medicament delivery training device configured to provide stepwise instructions for using the device that are delivered to a user in a particular sequence is provided. The device includes a housing having an actuation member to simulate delivery of medicament from the device. The device also includes a control interface associated with the device, the control interface including at least one responsive member reactive to a user input. The device further includes a signal output component associated therewith, and circuitry associated with the device configured so as to control a provision of the stepwise instructions to the user in the particular sequence.

22 Claims, 13 Drawing Sheets

Figure 7

| CS = 1, CL = 0, CE = 0 | Instruction 1, English, No emphasis |
| CS = 1, CL = 0, CE = 1 | Instruction 1, English, With emphasis |
| CS = 2, CL = 0, CE = 0 | Instruction 2, English, No emphasis |
| CS = 2, CL = 0, CE = 1 | Instruction 2, English, With emphasis |
| CS = 3, CL = 0, CE = 0 | Instruction 3, English, No emphasis |
| CS = 3, CL = 0, CE = 1 | Instruction 3, English, With emphasis |
| CS = 4, CL = 0, CE = 0 | Instruction 4, English, No emphasis |
| CS = 4, CL = 0, CE = 1 | Instruction 4, English, With emphasis |
| CS = 5, CL = 0, CE = 0 | Instruction 5, English, No emphasis |
| CS = 5, CL = 0, CE = 1 | Instruction 5, English, With emphasis |
| CS = 6, CL = 0, CE = 0 | Instruction 6, English, No emphasis |
| CS = 6, CL = 0, CE = 1 | Instruction 6, English, With emphasis |

| CS = 1, CL = 1, CE = 0 | Instruction 1, Spanish, No emphasis |
| CS = 1, CL = 1, CE = 1 | Instruction 1, Spanish, With emphasis |
| CS = 2, CL = 1, CE = 0 | Instruction 2, Spanish, No emphasis |
| CS = 2, CL = 1, CE = 1 | Instruction 2, Spanish, With emphasis |
| CS = 3, CL = 1, CE = 0 | Instruction 3, Spanish, No emphasis |
| CS = 3, CL = 1, CE = 1 | Instruction 3, Spanish, With emphasis |
| CS = 4, CL = 1, CE = 0 | Instruction 4, Spanish, No emphasis |
| CS = 4, CL = 1, CE = 1 | Instruction 4, Spanish, With emphasis |
| CS = 5, CL = 1, CE = 0 | Instruction 5, Spanish, No emphasis |
| CS = 5, CL = 1, CE = 1 | Instruction 5, Spanish, With emphasis |
| CS = 6, CL = 1, CE = 0 | Instruction 6, Spanish, No emphasis |
| CS = 6, CL = 1, CE = 1 | Instruction 6, Spanish, With emphasis |

MEDICAMENT DELIVERY TRAINING DEVICE

CROSS-REFERENCE TO RELATED APPLICATIONS

This application is related to U.S. Application No. 61/620,168 filed on Apr. 4, 2012 to which priority is claimed in accordance with 35 USC 119. The entirety of the application is incorporated by reference herein.

BACKGROUND

Performing a medical treatment or test on oneself carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing anxiety associated with self administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices and methods to assist in training individuals to inject themselves or otherwise self-administer medication are beneficial in decreasing or preventing the anxiety associated with medicament delivery.

BRIEF DESCRIPTION OF THE DRAWINGS

FIG. 7 provides a chart representative of an exemplary embodiment of the circuitry provided at step 50 of FIG. 3.

DETAILED DESCRIPTION

Figure 1:
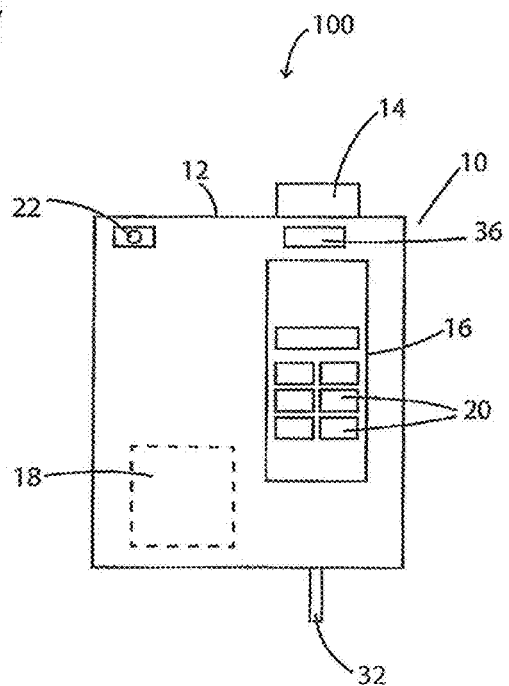
FIG. 1 provides a schematic of an embodiment of a medicament delivery training device.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

The inventors have identified a need for a training device to improve user comfort and confidence in self-delivery or self-administration of medicament. In addition to increasing confidence in self-administration in users by practicing with a training medicament delivery device, the inventors have identified additional benefits associated with multi-sensory learning regarding a medicament delivery training device. It has been discovered that multi-sensory learning establishes multiple pathways in separate areas in the brain and ultimately results in a highly effective learning experience. However, in order to gain benefits from multi-sensory learning devices, certain requirements must be met including but not limited to the following: the sources of stimuli must be in close proximity to one another; the sources of stimuli must be synchronous; the stimuli must be congruous semantically, otherwise the superior colliculus (area of the brain located in the midbrain known for integrating multiple sources of information) will segregate the stimuli instead of integrate them; and finally, the use of extraneous materials must be limited. With knowledge of the essential factors in multi-sensory learning and incorporation of the multi-sensory learning features into a training device, the inventors have developed a novel, cutting-edge medicament delivery training device.

Exemplary embodiments of the medicament delivery training device can be implemented to educate users on the proper operation and usage of a medicament delivery device. The training device can be used to make prospective and current users of medicament delivery devices feel more comfortable and confident in self-administration of medicaments, and can help users understand the proper steps of medicament delivery. Exemplary embodiments of the medicament delivery training device can be used by a user before the user administers an auto-injection using an actual automatic injection device corresponding to the automatic injection training device and/or can be used as needed or desired by the user. Other exemplary embodiments of the invention herein pertain to manual injection devices and manual injection training devices used by the user.

The medicament delivery training device 10 takes advantage of the multisensory learning capabilities of the human brain. As such, the medicament delivery training device 10 provides the means to stimulate primarily the visual, auditory and somatic systems of the human nervous system.

Visual stimuli or feedback can be generated mechanically or electronically. An example of a mechanically generated visual stimulus is a plunger moving past an inspection window or a shroud extending from the device. An example of an electronically generated visual stimulus is an LED blinking or an LCD display showing an icon.

Auditory stimuli or feedback can also be generated mechanically or electronically. An example of a mechanically generated auditory stimulus is the "click" that can be heard if two parts interlock. An example of an electronically generated auditory stimulus is a beeper or a speaker that plays spoken instructions.

Somatic stimuli or feedback, also called somatosensory stimuli or tactile feedback, is typically generated mechanically. In a typical embodiment of medicament delivery training device 10, there are a large number of somatic stimuli, such as actuation forces, abrasion resistance, frictional forces, spring compression, the feel of a click if two parts interlocking, surface texture, vibrations, weight sensation, and any other similar stimuli or feedback known to those of skill in the art.

A "predetermined value" as used herein, for example, includes but is not limited to a value or range of values relating to an event involving use or operation of the device. These may include, but are not limited to thresholds, ceilings, baselines or range values that are desired or undesired for a particular event. Examples of predetermined values include, but are not limited to, a predetermined orientation value, predetermined time value, or a predetermined contact value, in addition to other predetermined values described herein refers to a value that is used as a reference value in relation to a value, signal, or indication that is detected by, for example, a sensor of the delivery training device. Predetermined value may include an optimal value, or a sub-optimal value, or any value there between.

In one example, a predetermined perpendicularity value may include a 90 degree angle between the device and a target region for the training device, an additional predetermined perpendicularity value may include a 10 degree angle between the device and a target region for the training device. At either predetermined perpendicularity value, or at any value there between, a signal output component may be initiated. The signal output component may therefore be an error message or a congratulatory message, for example.

The term "condition" as used herein includes but is not limited to a user input, a status of the device, anything that is sensed by the device, correct or incorrect stepwise activities, usage of the device over time, among other conditions.

The term "error condition" as used herein includes but is not limited to a condition pertaining to a mistake by the user in using the device, whether the mistake is incorrect positioning or contact between the device and the user, or whether the mistake is an out of order step, a step that exceeds or fails to meet predetermined time value (such as an undue pause during or between steps, or insufficient time for conducting a step or transition between steps). Error conditions may also include errors of the device itself, including low or lack of power or failure to operate as intended.

The term reconstituted as used herein includes a return of the components to their original state. For example, following use of the medicament delivery training device, once the device is in a post-delivery state, it can be reset for subsequent use. As part of the resetting of the training device from a post-delivery state to a pre-delivery state, the signal output components including audio, visual, olfactory, gustatory, and tactile are also reset back to their original states, or reconstituted, such that a subsequent training can be performed with the training device.

The term associated or association, as used herein, includes but is not limited to direct and indirect attachment, adjacent to, in contact with, partially or fully attached to, and/or in close proximity therewith. The term "in conjunction with" as used herein includes but is not limited to synchronously or near synchronous timing, the phrase may also include the timing of outputs, where one output directly follows another output.

In one embodiment, a medicament delivery training device configured to provide stepwise instructions for using the device to a user in a particular sequence is provided. The device includes a housing having an actuation member to simulate delivery of medicament from the device. The housing of the device may include any shape, including but not limited to elongated, round, cylindrical, flat, or any other such shape contemplated by those skilled in the art.

The device also includes a control interface associated with the device, wherein the control interface includes at least one responsive member reactive to a user input. A signal output component associated with the device is further provided. Circuitry associated with the device is configured to control a provision of the stepwise instructions to the user in the particular sequence.

Communication occurs between the user and the device via the signal output component and the control interface. The medicament delivery training device can alert the user of different conditions of the device via the signal output component. An output of the signal output component of the device may be initiated, in one embodiment, in response to a predetermined elapsed time value occurring within the particular sequence of stepwise instructions. In one example, the predetermined elapsed time value period includes a pause between steps of the stepwise instructions. The term "value" as used herein, may refer to a specific value or a range of values.

In another embodiment, an output from the signal output component is initiated when the user correctly performs one or more steps in the particular sequence within a predetermined time period. This predetermined time period can be based on a predetermined average time period required to perform the steps of the sequence. In other embodiments, the output may be initiated if an error in the use of the device occurs. When an error is detected by the device, a signal output is initiated to alert the user of the error. Errors are often detected by the device with the user of sensors, and often may be used to identify a mistake by the user in using the device, including but not limited to an out of sequence step in using the device, a failure to properly align the device before use, or use of the device in an incorrect location or orientation as identified by the sensors. The device may be configured to emphasize the step in which the user received an error message when that user returns to the step in a later training so that the user can take additional care and avoid making the error in that step in subsequent trainings.

The signal output component described herein includes sensory outputs provided to a user, including but not limited to visual stimulation, audio, vibration or tactile stimulation, a flavor, or a smellant or a fragrance, (olfactory simulation) among other possible sensory outputs. Signal outputs are used herein by the device and system to communicate with and provide feedback to the user. In one embodiment, the signal output component generates a visual output including at least one light or screen display, or a combination thereof. The visual stimulation or feedback may include visual output such as an LED and/or an LCD display, for example. The display may provide information to the user about the medicament delivery training or simulation and about the medicament delivery training device. It may also provide information about the user's condition or any other type of information useful for the user. Other types of visual feedback known the art are contemplated within the invention herein.

In another embodiment, the signal output component of the device may generate an audio output, wherein the audio output may include a sound or a series of sounds. The audio output or feedback may include a beeping sound, an audible instruction or an audible message, musical feedback, or any other type of audio output as known to those of skill in the art. In one embodiment, the medicament delivery training device is provided wherein a speaker is associated with the device for transmitting the audio output from the device. The speaker may be attached to the device, or the speaker may be wired or wirelessly connected to the device.

In another embodiment either olfactory (smellant) or gustatory (taste) feedback may be provided as a signal output by the device to communicate with the user. The olfactory and gustatory feedback may be presented in combination with one another or may be in combination with any of the other signal outputs described herein to improve learning and training of the user of the device. Furthermore, in some embodiments, the olfactory and/or gustatory feedback may be used to simulate the olfactory and/or gustatory output received from the medicament delivery device.

Other types of output or feedback provided by the device can include kinesthetic output such as clicks, locks, or actuation forces associated with the use of the device, or tactile output or feedback such as temperature change or vibration of the device, for example. Examples of tactile output can be found in U.S. Pat. No. 8,138,896. Many of the visual, auditory, and tactile outputs described herein are not necessarily only feedback to the user of the device, but can be prompts made by the device to a user to solicit user input or a user action, or to discourage user input or user action.

Any of the abovementioned outputs by the signal output component can be presented along with any of the other outputs of the device. For example, a visual and an audio stimulation or feedback may occur at the same time or within the same step of the training to enhance training of the user. Furthermore, the inventors have discovered that a combination of mechanical feedback (kinesthetic) and electronic feedback enhances the learning experience of a user when using the medicament delivery training device.

In another embodiment, the medicament delivery training device includes a sensor to detect a condition of the device, wherein an output of the device from the signal output component is initiated in response to a predetermined value for a condition. In one particular embodiment, the sensor may be an orientation sensor provided to detect an orientation of the device, wherein the signal output component is initiated if the orientation of the device meets a predetermined orientation. The orientation dictates the position of the medicament delivery training device relative to another object, for example, relative to the user during delivery. In some instances, particular injection devices must be oriented in a certain orientation such that the needle of the injector is beneath, in some instances, the body part being injected so as to avoid air bubbles in the medicament while in the device prior to its injection into the user. Certain medications may require certain modes of delivery or application, and may dictate the orientation of the device during delivery. The orientation sensor is useful in identifying the proper orientation for the device based on the medicament being administrated or the type of delivery device.

In another embodiment, a contact sensor may be provided to detect a contact or insufficient contact between the device and the user, wherein the signal output component is initiated if the contact of the device meets a predetermined contact value, or in other instances if the contact of the device fails to meet the predetermined contact value. This predetermined contact value may be set at 100% contact between the device and the portion of the body of the user being used for the delivery of the medicament, or the contact value may be set between 90-99%, or 80-88% contact such that a user can be made aware when there is sufficient contact between the device and the user for adequate delivery of the medicament from the device. The sensor can be configured to sense the angle between a longitudinal axis of the device and the surface of the user where the delivery of the medicament is to occur. Additionally, or alternatively, in some circumstances contact sensors may be provide don the portion of the device which is intended to contact the surface of the user where delivery of the medicament is to occur, therefore the contact sensor can alert the user when sufficient contact has been made. The contact sensor can also alert the user when sufficient contact has not been made with the surface of the user.

In another embodiment, the device includes a perpendicularity sensor provided to detect the perpendicularity of the device relative to a surface of the user, wherein the signal output component may be initiated if the perpendicularity of the device meets a predetermined perpendicularity value. The perpendicularity sensor can sense the angle created between a longitudinal axis of the device and the surface of the user where the delivery of the medicament is to occur. The predetermined perpendicularity value takes into account the best angle or range of angles provided between the device and the user within which to deliver the medicament. This value may vary based on the type of medicament being delivered. In some instances, a right angle between the device and the surface of the skin of the user may be the optimal perpendicularity value. However, in other instances, the predetermined perpendicularity value may range from a 10 degree angle to a 45 degree angle or a 50 degree angle to a 90 degree angle. Therefore, in some instances, the sensor is provided to detect correct alignment of the device during the simulation, as described above in one example of alignment is the perpendicularity of the device. Perpendicularity sensors which incorporate the use of a light on the device may be used to properly align the device relative to the user prior to use.

In a further embodiment, a location sensor may be provided to detect a correct location for the medicament delivery, wherein the signal output component is initiated if the location meets a predetermined location value. The location for the medicament delivery is important with a medicament in which the location for delivery on the body of the user must rotate from one place to another. Oftentimes the recommended application of medicaments to the body requires rotation of the location of administration. For example, the first administration of the medicament may be on the arm, whereas the next application of the medicament may be on the thigh region, such that the locations of application on the body of the user are rotated. The movement of the location of the administration may prevent to some extent any one location from becoming overused, sensitive, bruised, or damaged over the course of the treatment.

Additional sensors of the medicament delivery training device include proximity sensors, resistive sensors, and tactile sensors, temperature sensors, alignment sensors, accelerometers, gyroscopes, and perpendicularity light sensors or any other sensor suitable for detecting one or more of the conditions associated with the device and for assisting the user in the proper use of the training device.

In another embodiment, the medicament delivery training device further includes a microprocessor. The circuitry of the device may include at least in part, the microprocessor, the signal output component for initiating audio, and visual, outputs, among other electronic components. The components may be operatively coupled by electrical conductors, however, in other embodiments the components may be operatively coupled without being physically connected. For example, in some embodiments, at least a portion of the components included in an electronic circuit system can be inductively coupled. In other embodiments, at least a portion of the components included in an electronic circuit system can be evanescently coupled.

The circuitry of the device may include a flexible printed circuit board to electronically couple with the components contained therein. The circuitry may be disposed in any suitable manner relative to the housing of the device, or may be associated with the housing of the device. In some embodiments, for example, the circuitry can be integrated with the simulated medicament delivery training device. The circuitry can be contained within the housing, and/or it may be partially or fully assembled concurrently with and/or with the same processes of the medicament delivery training device, the circuitry may alternatively or in addition be provided on the outer portion of the housing of the device.

In yet another embodiment, a non-transitory computer-readable medium embedded in a medicament delivery training device is disclosed. The non-transitory computer readable medium stores instructions executable by the microprocessor or another processing device to cause the processing device to output audio via the signal output component in the medicament delivery training device in response to an activation of a responsive member on a control interface of medicament delivery training device to guide a user through the stepwise instructions for operation of the medicament delivery training device in response to the user input and to instruct the user to actuate the actuation member of the device to simulate an actual medicament delivery in response to an actuation of the actuation member of the device.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

Powering on the device, in some embodiments, initiates or activates the stepwise instructions to the user. However, the instructions may be initiated or activated by any suitable means known in the art. For example, in another embodiment, activation of the actuation member may initiate the stepwise instructions of the device. In yet another embodiment, the stepwise instructions may be initiated by moving the device, which may be recognized via a motion sensor on or associated with the device. In still another embodiment, a user input via the responsive member of the device may activate or initiate the instructions.

The control interface of the device may provide the user with the ability to change the language of the audio output of the device. Languages that the audio output may be communicated to a user include but are not limited to, English, Spanish, French, Arabic, Portuguese, Russian, Chinese, and Japanese. It is known by those of skill in the art that any language may be provided via the audio output of the device.

In some embodiments, the device is associated with a memory storage module which may be either a removable or a non-removable memory storage module. Memory contained in this module may include various languages of audio, updating information for the device, information about various medical conditions and medicaments including usage, storage, and any other important information associated therewith. The memory module may further comprise a script for guiding the user through the steps of the medicament delivery simulation. The script may be provided in any language as described above.

In some embodiments, the device may further include a skin type measuring device or module used to detect the type of skin of the user as is provided in US Patent Application Publication US 2008/0265170A1 by Ales et al, or any other type of skin type measuring device or module as known in the art. The device may also detect differences between skin at various locations on a body, differences between the skin of different age groups, ethnicities, genders, etc., to assist a user in determining a location for medicament delivery. In some embodiments, the device may record and informs a user of the last medicament application site and direct a user to the next medicament application site on the body; this information may be provided in a rotation. The device can additionally instruct a user on the optimal method for applying or injecting the particular medicament (subcutaneous, intramuscular, etc.), or the ideal location on the user for applying or injecting the medicament (buttocks, arm, thigh, etc.).

In an embodiment, the medicament delivery training device mimics actual delivery, however, in the simulated delivery, no therapeutic fluid or material or medicament is ejected from the medicament delivery training device or applied to the user. The medicament delivery training device can be further provided, in an embodiment, with a medicament delivery simulation mechanism, wherein in one embodiment the medicament simulation mechanism comprises a medicament delivery simulation member. The medicament delivery simulation member is configured to extend through an opening in the housing of the medicament delivery training device. When the actuation member is actuated, the medicament delivery simulation member simulates the force and motion of a medicament delivery member without delivering medicament to the user. This mechanism provides a user with the actual touch, look, and feel of the actual delivery of the medicament without delivering any medication to the user. The mechanism mimics the actual medicament delivery process so as to prepare the user with the sound, feel, and other senses experienced during the medicament delivery process with as much similarity as possible such that any anxiety associated with the actual medicament delivery, whether by injection or topical or by any other means known in the art, is reduced or for the user. The medicament delivery simulation member, in other embodiments, may comprise a sheath or other such member to simulate the tactile feel of a medicament delivery device.

Following actuation of the device, a re-setting of the device may be necessary. This can be accomplished manually and mechanically, in one example, by pressing the portion of the device with the ejected medicament simulation member against a surface until the ejected member is re-inserted into the housing of the device.

The medicament delivery training device may further include at least one responsive member that is reactive to user input. The responsive member may include a button, either virtual or non-virtual, a switch, a touch sensor, a toggle, a heat or tactilely sensitive response sensor, or any combination thereof, or any other such device as known in the art. The responsive member may be part of the control interface of the device. Alternatively, or in addition to being disposed on the device, the at least one responsive member can be in association with the device. The control interface can be used for generating user commands, and the circuitry disposed within the device or in association with the device is in communication with the control interface. The circuitry may be embodied as a processor-based circuit, wherein it is configured and arranged to receive input from the user via the control interface, wherein the processor-based circuit includes an audio signal processor configured and arranged to provide audio to the user to instruct the user while using the medicament training delivery device during the medicament delivery simulation, wherein the audio is controlled by the responsive member on the control interface via user input.

In one embodiment, the medicament delivery training device may be connected to an external source, such that information can be communicated to and/or from the device.

In another embodiment, the information communicated to and/or from the device includes at least one computer readable file. Such files may include videos not limited to but including training videos. Other information which may be communicated to and/or from the device includes information regarding performance of the user in using the device, trending data regarding the use of the device and the operation of the device itself, software information, updated software, language software information, and any other information that would be beneficial to the use and/or operation of the device. The communication of information or data to and/or from the device may occur via a wire or wireless connection, and the information may be communicated to and/or from a network, a computer, a system, or to and/or from another device.

In another embodiment, the device includes a program code module wherein the module records a condition of the device, wherein the condition may include user compliance or user incompliance with proper use of the device. Other conditions of the device which may be recorded include a user input, a status of the device, anything that is sensed by the device, correct or incorrect stepwise activities, usage of the device over time, among other conditions. In an embodiment, the program code module can be incorporated as part of the device, connected to the device, in communication with the device, or in sync with the device. For example, when a user is not using the medicament delivery training device on a regular basis (regular basis can be identified by a predetermined, pre set time period), the device will record the usage of the device, and may be configured to alert a user or an outside personnel such as a physician, for example, of the recorded usage. The alert may indicate the amount of training or simulation that has been recorded by the device, or the accuracy or inaccuracy with which the device is being used. Examples of user compliance which may be recorded by the device include correct and incorrect use of the device. The program code module can be used to indicate to the user or outside personnel, a physician for example, whether the user is correctly and accurately using the device.

Alternatively, or in addition, the program code module may provide the user information relating to his or her use of the device including the amount of training or simulation accomplished as well as feedback regarding the quality of training or simulation recorded. The program code module may also provide the user of the device with areas of improvement in the medicament delivery simulation steps, or may provide the user with positive feedback regarding areas where the user has complied with the steps or use of the device. The program code module can include a records and statistical analysis feature, and can download and/or transfer records to and from the device. This program code module may be helpful in research and development of the device. With the use of the program code module recording and tracking various features and uses of the device, one can readily determine areas in which the device may be improved. The program code module also includes graphing capability of recorded data, as well as data trending results of the performance of the device and/or the user, the efficiency of the user and of the device in training and/or simulation. As part of the program code module, features such as an alarm or indication (visual, auditory, tactile . . . etc.) to the user of the device or to another can be initiated if the data received and analyzed by the module is out of range or is trending out of range (a range will be predetermined).

As will be appreciated by one of skill in the art, certain examples of the present invention may be embodied as a device or system comprising a processing module, and/or computer program product comprising at least one program code module. Accordingly, the present invention may take the form of an entirely hardware embodiment or an embodiment combining software and hardware aspects, commonly known as firmware. As used herein, firmware comprises a computer program module that is embedded in a hardware device, for example a microcontroller. It can also be provided on flash memory or as a binary image file that can be uploaded onto existing hardware by a user. As its name suggests, firmware is somewhere between hardware and software. Like software, it is a computer program which is executed by a microprocessor or a microcontroller, but it is also tightly linked to a piece of hardware, and has little meaning outside of it.

The term "microprocessor" may include a single processing device or a plurality of processing devices. Such a processing device may be a microcontroller, digital signal processor, microcomputer, central processing unit (CPU), field programmable gate array (FPGA), programmable logic device, state machine, logic circuitry, analog circuitry, digital circuitry, and/or any device that manipulates signals (analog and/or digital) based on operational instructions. The microprocessor may have operationally coupled thereto, or integrated therewith, a memory device or a memory module. The memory device or memory module may be a single memory device or a plurality of memory devices. Such a memory device may be a read-only memory, random access memory, volatile memory, non-volatile memory, static memory, dynamic memory, flash memory, and/or any device that stores digital information. A computer, as used herein, is a device that comprises at least one processing module, and optionally at least one memory device.

The data storage modules may include a storage medium component(s) such as, but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a random access memory (RAM), a read-only memory (ROM), an erasable programmable read-only memory (EPROM or Flash memory), an optical fiber, a portable compact disc read-only memory (CD-ROM), a DVD (digital video disk), or other electronic storage medium.

Computer program code modules for carrying out operations of certain embodiments of the present invention may be written in an object oriented, procedural, and/or interpreted programming language including, but not limited to, Java, Smalltalk, Perl, Python, Ruby, Lisp, PHP, "C", FORTRAN, Assembly, or C++. The program code modules may execute entirely on the device, partly on the device, as a stand-alone software package, partly on the device and partly on a remote computer or device or entirely on the remote computer or device. In the latter scenario, the remote computer or device may be connected to the user's device through a local area network (LAN) or a wide area network (WAN), or the connection may be made to an external computer (for example, through the Internet using an Internet Service Provider).

In one embodiment, the medicament delivery training device is configured to receive a memory module. The memory module may be removable from the device and may include information regarding a condition of the user or the device, medical or non-medical information about the user, an error condition of the device, pre-loaded information or data (i.e. information or data stored on the device), information or data added to the device, information regarding sequence of steps and instruction information, as well as information or data regarding medicaments. The removable memory module may also contain the language information for guiding a user through the steps of the medicament delivery simulation.

In a further embodiment, the medicament delivery training device includes an indicator which conveys information about a predetermined status of the device, or a condition of the device. Additionally, in an embodiment, the indicator may indicate but is not limited to an indication that that the medicament delivery simulation is complete or incomplete. The indication may be conveyed by audio, visual, tactile, or a smellant indication, or a combination thereof. The visual indicator may be disposed on the device or may be connected by a wire or wirelessly to the device. The visual indicator may be embodied as, but is not limited to, an LED light. In an example, the housing may include one or more display windows, through which a visual indicator can appear to simulate or mimic completion of an injection.

In one embodiment, the medicament delivery training device may further include a reminder feature to remind the user to use the device by initiating a signal output. The reminder can be initiated by the signal output of the device, and as described above can be auditory, visual, tactile or any other type of output described in other embodiments herein, and any additional output known to those of skill in the art. The reminder feature of the device may also remind a user of an upcoming appointment with a physician appointment, or appointment with another health care professional.

In another embodiment, the safety mechanism of the device prevents unintended actuation of the actuation member, and can include a manual lock and unlock safety lock, a button on the device which locks and/or unlocks the device, a safety cap which prevents unintentional actuation of the device when it is placed over top of the actuation device, or any other safety mechanisms to prevent unintended actuation of the actuation member as known in the art.

Although the medicament delivery devices have been shown and described above as being primarily single-use medicament delivery training devices, in some embodiments a medicament delivery training device can include any suitable device for delivering one or more doses of a medicament to a patient, or one or more medicaments to a patient. In some embodiments, a medicament delivery device can be an injector containing multiple doses of a chronic-care medicament, such as, for example, insulin. In such embodiments, an electronic circuit system can output instructions associated with not only an initial use of the medicament delivery device, but also associated with repeated uses, dosage monitoring or the like. In other embodiments, a medicament delivery device can include a transdermal medicament delivery device, an inhaler or a nasal medicament delivery device.

In yet another embodiment, the medicament delivery training device may be configured to simulate single dose or multi-dose medicament delivery. The device may track the number of doses dispersed by the device (i.e., by accumulated depletion).

In trying to simulate an actual medicament delivery device and system, the device herein requires a certain force by the user for activation of the device. Multiple forces can be simulated by the device such as the force that must be used (e.g. manual, spring loaded, electric motor, pneumatic cartridge, ultrasonic) to force a needle to puncture the skin in an injector or an auto-injector device. In another example, a different force may be needed to disperse a medicament from a medicament delivery device onto the surface of a skin of a user. The medicament delivery training device can vary to compensate for these different forces so as to replicate the force of the actual medicament delivery device being simulated. Additional forces such as that used to push a fluid through the needle of a medicament delivery device (manual, spring loaded, electric motor, pneumatic cartridge, ultrasonic) can also be simulated by the medicament delivery training device so as to reduce anxiety of the user in using the medicament delivery device.

In another embodiment, a medicament delivery training device configured to provide stepwise instructions for using the device to a user in a particular sequence is provided, the device having a pre-delivery state and a post-delivery state. A post-delivery state, as referenced herein, includes any state where the medicament delivery training device simulates medicament delivery. The medicament delivery training device includes a housing having an actuation member to simulate delivery of a medicament from the device, a control interface associated with the device, the control interface comprising at least one responsive member reactive to a user input. The device further includes a signal output component associated with the device, and circuitry associated with the device configured so as to control a provision of the stepwise instructions to the user in the particular sequence. The device further includes a medicament delivery simulation mechanism disposed within the delivery training device, the medicament delivery simulation mechanism having a first position when the device is in the pre-delivery state and a second position when the device is in the post-delivery state, and wherein the medicament delivery simulation mechanism is associated with the actuation member such that when the actuation member is actuated, the medicament delivery simulation mechanism is urged from the first position to the second position. The medicament delivery simulation mechanism can be reset from the second position to the first position for reuse of the medicament delivery training device. The actuation of the actuation member and the reset of the medicament delivery simulation mechanism can be a mechanical or a non-mechanical action. In a further embodiment, the device is configured to power off after a pre-set time period. In some examples, this time period may occur after a period of time where no user input is received, or a period of time wherein the device is not used. This time period may be pre-set before use by the user, or, alternatively the user may be able to set a pre-set time for the device to automatically power off.

In an embodiment, when the medicament delivery training device changes from a pre-delivery state to a post-delivery state, tactile feedback, olfactory feedback, gustatory feedback, visual feedback or auditory feedback, or any combination thereof, of the training device mimics the tactile, visual and auditory feedback of an actual medicament delivery device.

In one embodiment when the medicament delivery simulation mechanism is reset from the second position to the first position, and the training device is reset from the post-delivery state to the pre-delivery state, any visual, olfactory, gustatory, auditory, or tactile feedback, or any combination thereof, associated with the medicament delivery simulation mechanism is reconstituted for a subsequent training. Generally, reconstituted as used herein refers to the reset of the various visual, auditory, tactile, olfactory and gustatory feedback provided in the previous simulation in preparation for a subsequent simulation or training.

In some embodiments, the first position refers to a retracted position and the second position refers to a protracted position of the training device. In a further embodiment, the training device includes a medicament delivery simulation member wherein when the training device is in a pre-delivery state, the medicament simulation member is in a retracted state, and when the training device is in a post-delivery state, the medicament simulation member is in a protracted state. The medicament simulation member may be reset from the protracted to the retracted state prior to reuse of the medicament delivery training device.

In a further embodiment, the tactile, visual, olfactory, gustatory, and/or auditory feedback of the training device are output in conjunction with one another to simulate the tactile, olfactory, gustatory, visual and/or auditory feedback of a medicament delivery device.

The medicament delivery training device including the medicament delivery simulation mechanism provides tactile, visual, and auditory stimuli to a user, wherein during the training, the tactile, visual, gustatory, olfactory, or auditory feedback, or any combination thereof, are synchronized in a manner such that an actual delivery device is simulated. The synchronization of the stimuli is significant in facilitating multisensory learning of the user, as aforementioned.

In a further embodiment, the medicament delivery training device includes a memory module for recording a user of the device by the user. The memory module may record or track both correct and incorrect use of the device. In a further embodiment the memory module compares the use of the device by the user as recorded by the memory module with a predetermined use of the device by the user and initiates an output of the device to provide the comparison to the user. This feature is helpful in that a user is informed of the improvements that are made from one training to another. The user can therefore track his or her progress from one training to the next. In another embodiment, the memory module records errors made by the user in the use of the device, and wherein the memory module identifies and stores errors made by the user in the sequence of steps of the use of the device.

In a further embodiment of the device, when the user reaches a step in which an error was made by the user in a previous training, an output of the device is initiated to alert the user to the previous error in the step. This serves to help the user through the step in which the previous error was made by emphasizing the instructions at that step to prevent future error at that step. The emphasis may be in the form of augmented output by increasing the volume of the audible output, repeated instructions or providing instructions at that step at a slower pace where the audible output comprises instructions, changing the characteristics of the output whether it be a flashing light wherein the rate of flashing changes, or a color change in a light, or providing a different audible sound such as a beep, a musical tone, or a different alarming sound, furthermore the output may include a vibration of the device or other such warning to the user as is known in the art.

In still a further embodiment, the training device may provide trending results based on the recorded use of the device by the user. The trending results may be provided to the user or to a third party such as a doctor's office, for example. These trending results can help the user and others determine the user's progress in the use of the device and can also indicate weak or strong areas in the use of the device and throughout the self-administration or medical delivery process. The trending results as well as the results recorded by the memory module above can provide a benefit in the manufacturing process to provide for adjustments, for example, where certain mistakes are often made by users at certain points of the training process the device can be adjusted accordingly.

Turning to the drawings, FIG. 1 provides a schematic of an embodiment 100 of the medicament delivery training device 10. The device 10 includes a housing 12, an activation module 14, a control interface 16 for operation by a user and circuitry 18. The device 10 further includes responsive members 20 which are responsive to user input. A signal output component 22 is provided for communication with the user via visual, audio, tactile, and other signals. A medicament delivery simulation member 32 is provided in some embodiments to simulate an actual medicament delivery device, particularly where the medicament delivery training device 10 simulates an injector and/or an auto-injector delivery device.

Figure 2:
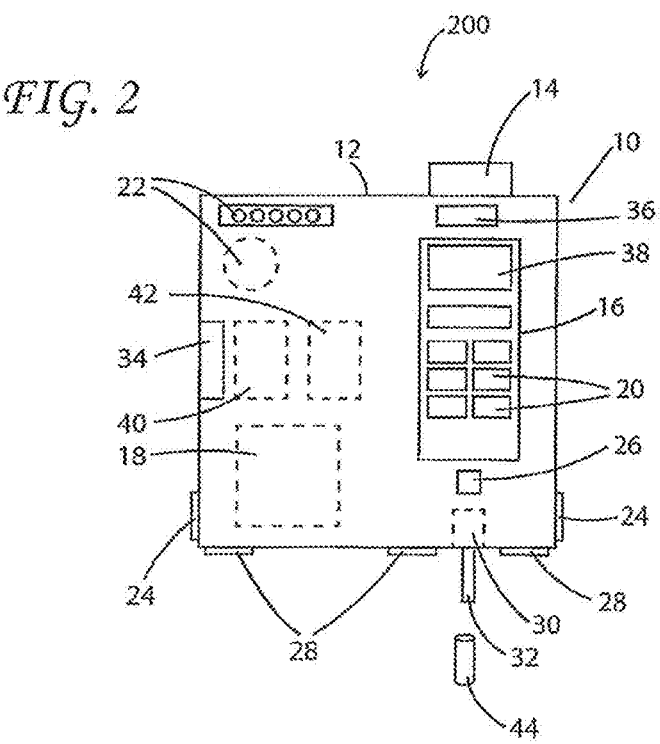
FIG. 2 provides a schematic of another embodiment of the medicament delivery training device.

In FIG. 2, a schematic of another embodiment 200 of the medicament delivery training device 10 is provided. This embodiment 200 includes the elements discussed in the embodiment above, and additionally includes a perpendicularity sensor 24, orientation sensor 26, and contact sensor 28 to orient the device properly before, during, and after use. An opening 30 is shown in the embodiment 200 which provides a space for the medicament delivery simulation member 32. A memory module 34 is provided as well as an indicator 36 and a display 38 in the embodiment 200. Furthermore, a program code module 40 records a condition of the device 10. The microprocessor 42 is provided as well as a safety mechanism 44 embodied as a cap in FIG. 2, however the safety mechanism 44 may take any shape so as to prevent injury or unwanted contact with the medicament delivery simulation member 32.

Figure 3:
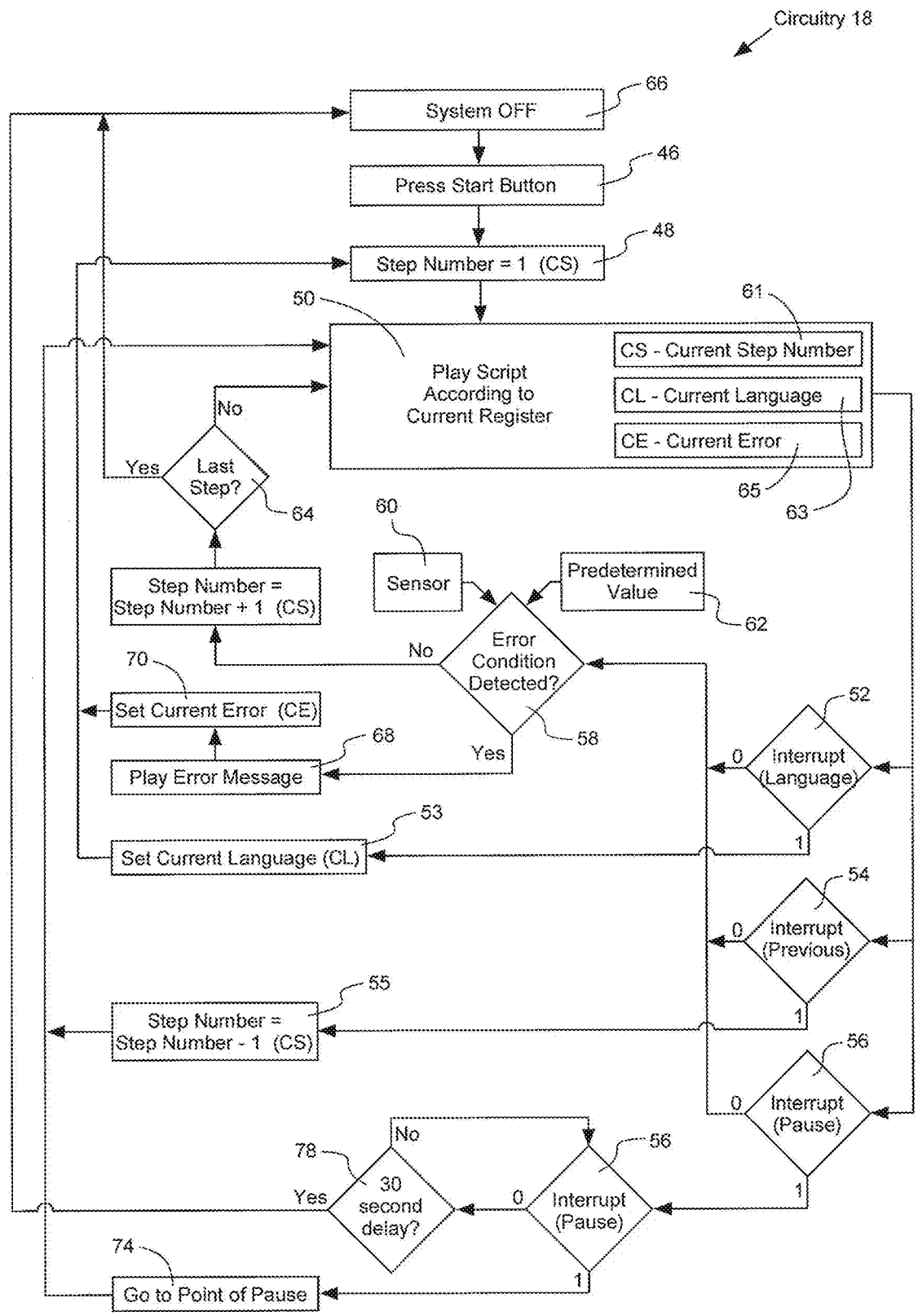
FIG. 3 is a flowchart of an exemplary operation of an embodiment of circuitry associated with the medicament delivery training device.

FIG. 3 is a flowchart of an exemplary operation of an embodiment of the circuitry 18 associated with the medicament delivery training device 10. A user can press the start button 46 to actuate the circuitry 18, which will then proceed to the first step in the sequence (step number=1) 48. The circuitry 18 will play a spoken script of the current instruction 50, selected according to a set of registers. In this exemplary embodiment, there are three registers; current step number (CS) 61, current language (CL) 63, and current error (CE) 65.

At this point the user has the option to interrupt the script to change the language 52 to set the current language 53, to interrupt the script to return to a previous instruction 54, wherein the system will return to a previous step in the sequence (step number=step number-1) 55, or to interrupt the script 56 by selecting the pause button 56 to pause the script. The medicament delivery training device provides a user the ability to move from one instruction back to a previous instruction. If the start/pause selection is input once, there is a 30 second delay 78 in the script before any additional input, the system will automatically turn itself off 66. If the user selects the pause button a first time 56 and then a second time 56, the system will go to a point of pause 74. This allows a user to process the instruction for a period of time, improving memory and learning through the training. In another embodiment, the start and/or pause buttons may be embodied as one button or feature of the device or multiple buttons or features of the device. After the point of pause 74, the system returns to play the script according to current register 50. If the current step is not the last step in the sequence, then the subsequent step is played in the sequence. The 30 second delay described in the steps above is not limited to a 30 second delay, but may include any predetermined or preset time period.

If no additional user input is provided after one of the three aforementioned selections (interrupt language 52, interrupt previous 54, or interrupt start/pause 56), the system determines whether an error condition is detected 58. This determination requires information received from at least one sensor 60 and/or at least one predetermined value 62. If no error condition is detected at step 58, and the circuitry 18 determines that it is at the last step in the sequence 64 the system is powered off 66. If it is not the last step in the sequence, the script is played according to current register 50. If an error condition is detected at step 58, the circuitry 18 initiates an error message to be played 68 and a current error to be set (registered) 70, wherein the system returns to the first step 48 in the sequence to begin the sequence again.

Figure 4A:
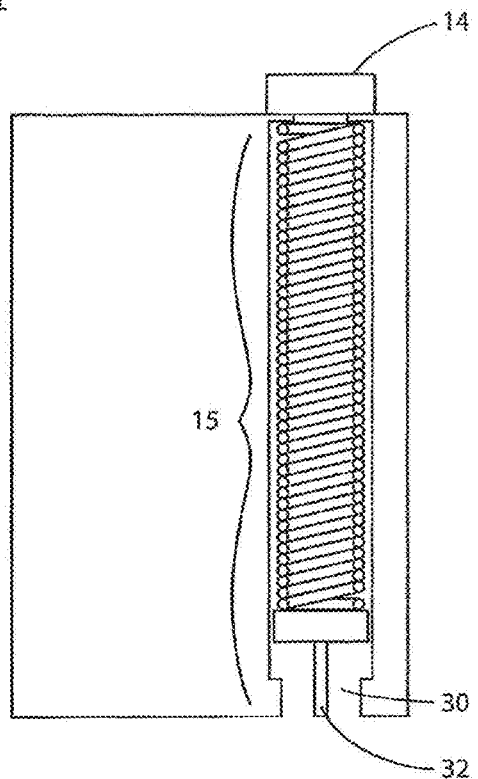
FIG. 4A is a front cross sectional view of an embodiment of the medicament delivery training device in a pre-delivery state.
Figure 4B:
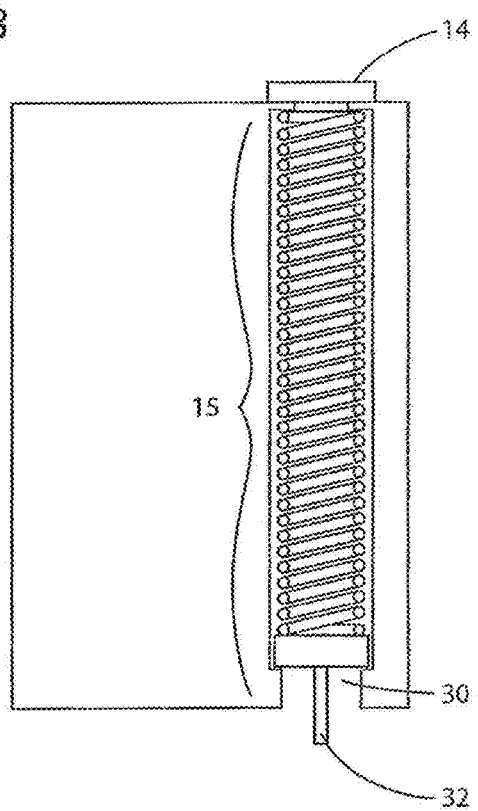
FIG. 4B is a front cross sectional view of the embodiment of FIG. 4A, wherein the medicament delivery training device is in a post-delivery state.

FIGS. 4A and 4B provide an embodiment of a medicament delivery training device 10, wherein the device has a pre-delivery state (FIG. 4A) and a post-delivery state (FIG. 4B). The device comprises a medicament delivery simulation mechanism 15, the medicament delivery simulation mechanism 15, having a retracted position (FIG. 4A) when the device 10 is in the pre-delivery state and a protracted position (FIG. 4B) when the device 10 is in the post-delivery state. The medicament delivery mechanism 15 in FIGS. 4A-B is provided as a spring mechanism, and the device shown is an injector device. The medicament delivery simulation mechanism 15 is associated with the actuation member 14 such that when the actuation member 14 is actuated, the medicament delivery simulation mechanism 15 is urged from the retracted position to the protracted position. The medicament delivery simulation mechanism 15 can be reset from the protracted position to the retracted position for reuse of the medicament delivery training device. The reset can be a mechanical or a non-mechanical reset.

Figure 5A:
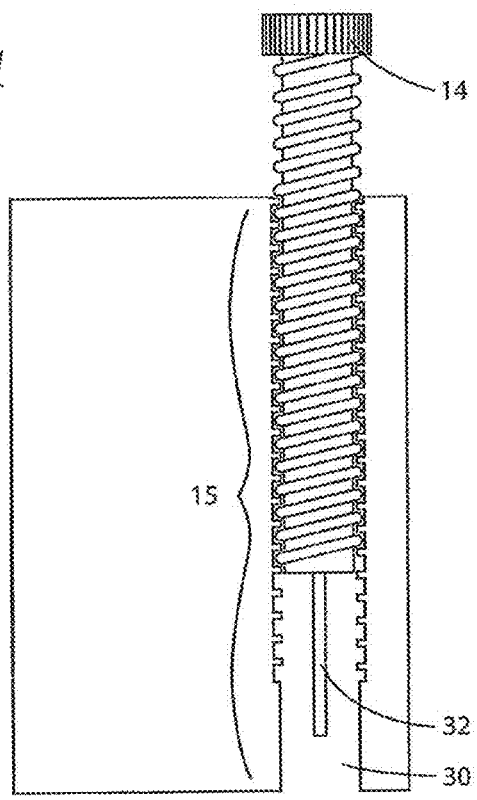
FIG. 5A is a front cross sectional view of another embodiment of the medicament delivery training device in a pre-delivery state.
Figure 5B:
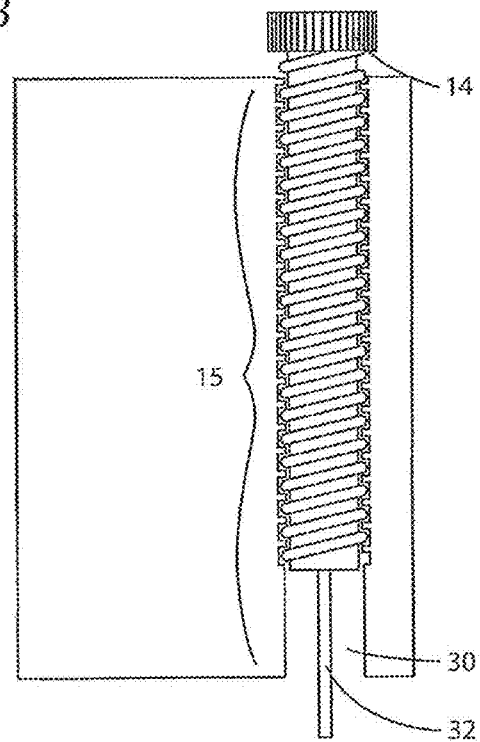
FIG. 5B is a front cross sectional view of the embodiment of FIG. 5B, wherein the medicament delivery training device is in a post-delivery state.

FIG. 5A is a front cross sectional view of another embodiment of the medicament delivery training device in a pre-delivery state, wherein the device is an injector which is activated by manually twisting the actuator 14 such that the delivery simulation mechanism 15 is forced down toward the opening 30, and the medicament delivery simulation member 32 is moved through the opening 30 in the post-delivery state of the device shown in FIG. 5B.

Figure 6A:
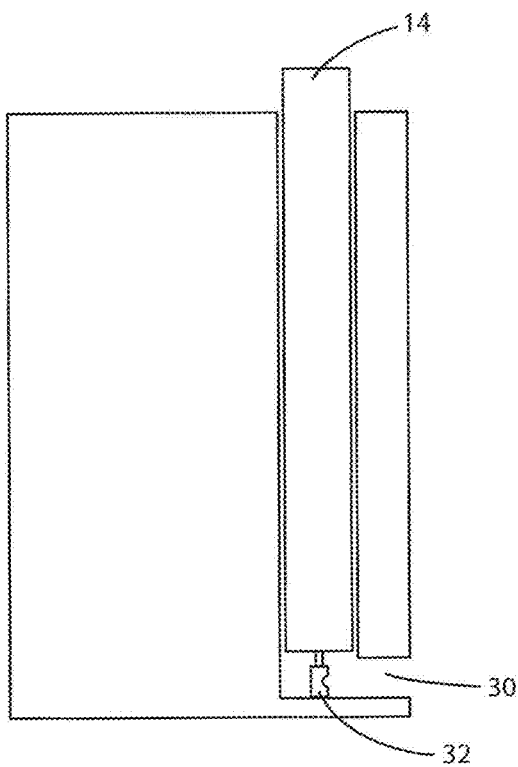
FIG. 6A is a side view of another embodiment of a medicament delivery training device in a pre-delivery state.
Figure 6B:
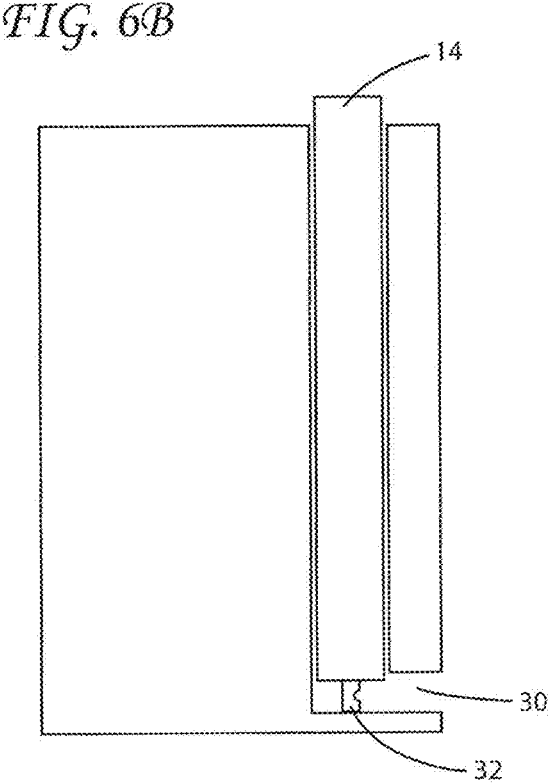
FIG. 6B is a side view of the embodiment of FIG. 6A, wherein the medicament delivery training device is in a post-delivery state.

FIG. 6A is a side view of another embodiment of a medicament delivery training device in a pre-delivery state. The embodiment of the device includes an actuator 14, medicament delivery simulation member 32 and the opening 30. FIG. 6B is a side view of the embodiment of FIG. 6A, after the actuator 14 is activated, and the medicament delivery training device is in a post-delivery state.

FIG. 7 provides an exemplary embodiment of a series of instructions provided by the medicament delivery training device according to the circuitry 18 provided at step 50 of the circuitry of FIG. 3. The circuitry 18 will play a spoken script of the current instruction 50, selected according to a set of registers. In this exemplary embodiment, there are three registers; current step number (CS), current language (CL), and current error (CE).

For example, the exemplary embodiment can play six spoken scripts of instructions. The exemplary embodiment can do so in two languages. In addition, circuitry 18 of the exemplary embodiment can play a normal spoken script, or a spoken script with extra emphasis. Selection between the normal spoken script and the script with emphasis is explained below. If there are six spoken scripts of instructions, in two languages, and two levels of emphasis, then there are a total of 24 instruction scripts, as shown in FIG.

7. For example, if CS=1, CL=0, and CE=0, circuitry 18 plays a normal spoken script of instruction of current step 1, in English.

The state of the registers is determined by what the user does next. If the user does not push any buttons (no interrupt), then the algorithm as depicted in FIG. 3 will go to the next step. Thus, the current step number (CS) increases by 1 before the circuitry plays a spoken script of an instruction (in effect, the next instruction). If algorithm logic 58 determines that the user has made an error, then the CE register is set from 0 to 1. In that case, the next time circuitry 18 plays the spoken script of a particular instruction, it will do so with a script that has more emphasis. For example, an instruction with no emphasis may say, for example: "please remove the first cap." An instruction with extra emphasis may say, for example: "the last time at this step, you took the second cap off before you took the first cap off. Please pay attention to taking the caps off in the right sequence. Now remove the first cap". If the user pushes the language button (interrupt), then the CL register is set from 0 to 1. It will play the other language—Spanish in this case—until the user pushes this button again and resets the CL register. Note that the number of registers, the number of instructions, and the number of languages can be any number. Also, it is possible to have more than two levels of emphasis.

Figure 8:
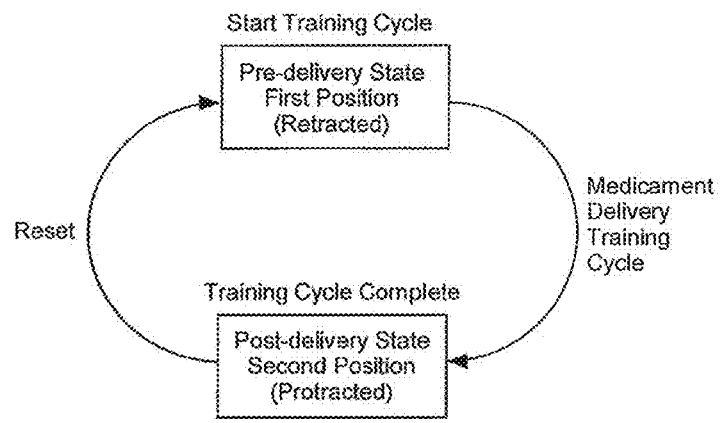
FIG. 8 is a diagram outlining exemplary states of the medicament delivery training device.

FIG. 8 provides a diagram outlining exemplary states of the medicament delivery training device from the pre-delivery state to the post-delivery state. At the beginning of the training cycle, the device is in a pre-delivery state and the medicament delivery simulation mechanism is in a first position. In some instances this first position is a retracted position, particularly in an embodiment where the medicament delivery training device is an injection training device. The next step in the cycle is the medicament delivery training cycle, wherein once the training cycle is complete, the device reaches the post-delivery state. In the post delivery state, the medicament delivery simulation mechanism is in a second position, which in some instances is a protracted position. At this point in the cycle, the device can be re-set prior to the next training cycle.

Figure 9A:
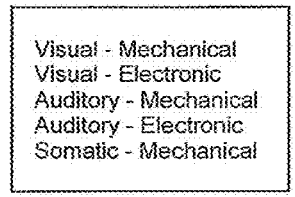
FIG. 9A provides a table identifying the sources of feedback provided within one housing of the medicament delivery training device.

FIG. 9A provides a table identifying the sources of feedback provided within one housing of the medicament delivery training device, wherein visual and auditory feedback can be provided either mechanically or electronically, and somatic feedback is provided mechanically.

Figure 9B:
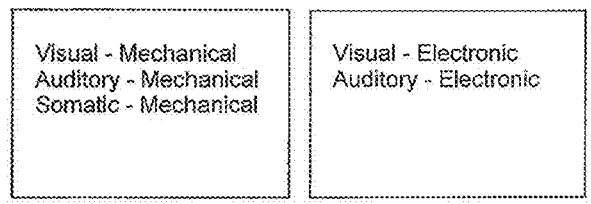
FIG. 9B provides a table identifying the sources of feedback of the medicament delivery training device may be provided in more than one housing.

FIG. 9B provides a table identifying the sources of feedback of the medicament delivery training device may be provided in more than one housing. In this embodiment, the mechanical feedback (visual, auditory and somatic) are provided in a first housing, and the electronic feedback (visual, auditory) are provided in a second housing.

Figure 10:
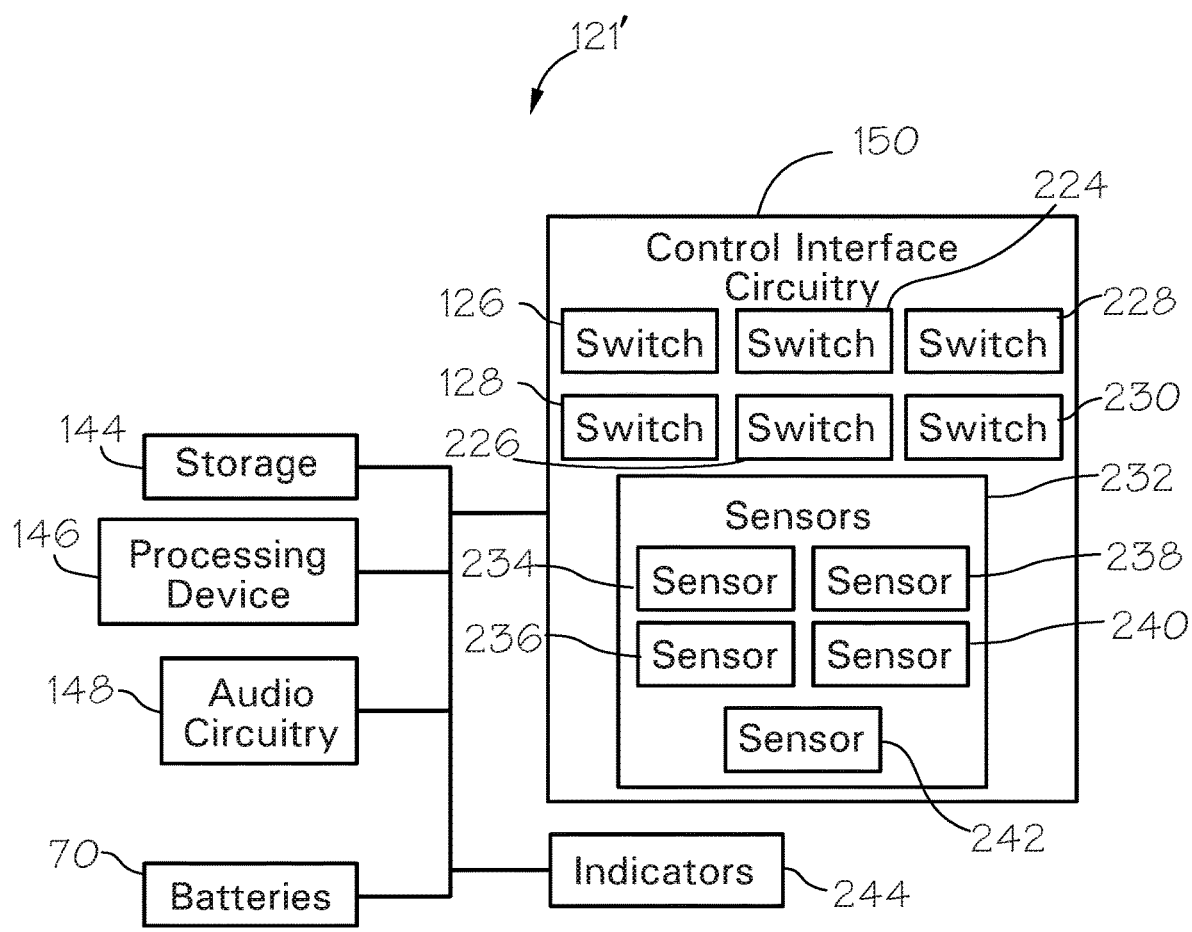
FIG. 10 is a block diagram illustrating another exemplary embodiment of circuitry that can be implemented by embodiments of the automatic injection training device.

FIG. 10 is a block diagram illustrating another exemplary embodiment of circuitry 121' that can be implemented by embodiments of the device 10. The circuitry 121' can include the storage 144, the processing device 146, the audio circuitry 148, the control interface circuitry 150, and the batteries 70. In the present embodiment, the control interface circuitry 150 can include the switches 126, 128, 224, 226, as well as switches 228, and 230, which can provide an interface between the user and the circuitry 121' to facilitate user control of the circuitry 121' and also can include sensors 232 including, for example, an activator button sensor 234, a sensor 236 to detect whether a first end 14' (first end 14' shown in FIG. 12) of the device is against a body of the recipient of the simulated autoinjection, a first cap sensor 238, a second cap sensor 240, and an orientation sensor 242, in non-limiting embodiments wherein a device includes a first cap and a second cap, for example. The sensors 232 can control the operation of the circuitry 121' in conjunction with the switches of the control interface circuitry 150.

In exemplary embodiments, actuation of switch 224 by the user can couple or decouple an electrical signal to the processing device 146 to cause the processing device 146 to select between different languages of the scripts 152 (scripts 152 not shown in FIG. 10). Actuation of switch 226 by the user can couple or decouple an electrical signal to the processing device 146 to cause the processing device 146 to determine in which operation mode the circuitry will operate. Actuation of switch 228 by the user can couple or decouple an electrical signal to the processing device 146 to cause the processing device 146 to decrease the volume of the output and actuation of the switch 230 can couple or decouple an electrical signal to the processing device 146 to cause the processing device 146 to increase the volume of the output.

The sensors 232 can operate to sense one or more conditions associated with the device 10 to aid in guiding a user through the automatic injection sequence using the device 10. In exemplary embodiments, the sensors can include proximity sensors, optical sensors, capacitive sensors, resistive sensors, tactile sensors, accelerometers, gyroscopes, or any other sensor suitable for detecting one of more conditions associated with the device 10.

The activator button sensor 234 can sense whether the firing button 34 (or actuation member 14) has been activated by the user. For example, the sensor 234 can be positioned with respect to the firing button 34 such that when the firing button 34 is depressed a portion of the firing button 34 contacts the sensor 234 to complete an electrical circuit.

The sensor 236 can detect whether the first end 14' is against a body of the recipient of the simulated autoinjection by, for example, sensing a capacitance or resistance of the recipient's skin via contacts disposed at the first end 14' of the device 10.

Figure 12:
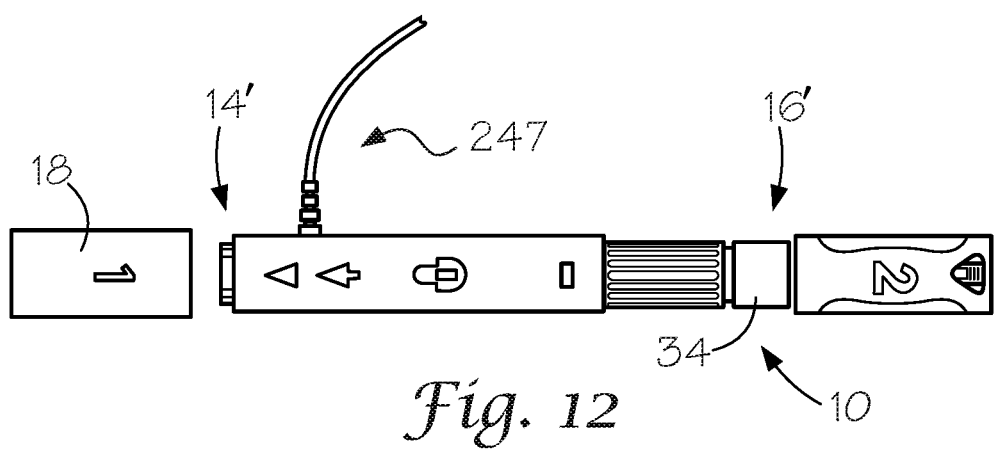
FIG. 12 illustrates an exemplary embodiment of the automatic injection training device with a cable to tether the automatic injection device to the base shown in FIG. 11.

The first cap sensor 238 can detect whether the cap has been removed (for example, safety mechanism 44, or cap 18 in FIG. 12). For example, the sensor 238 can be a proximity sensor positioned proximate to the cap 18 when the cap 18 is disposed on the first end 14' of the training device 10 such that the sensor 238 can detect when the cap is removed from the first end 14' of the device 10 by the user.

The second cap sensor 240 can detect whether the cap 20 has been removed by the user. For example, the sensor 240 can be an optical sensor configured to reflect electromagnetic radiation off of the cap 20 when it is disposed on the second end of the device 10 such that the sensor 240 is configured to detect when the cap 20 is removed.

The orientation sensor 242 can be a gyroscope and can detect an orientation of the device, for example, to determine whether the device is held perpendicularly to the recipient's body.

While exemplary embodiments of the sensors 232 have been described herein, those skilled in the art will recognize that different sensors can be used for each and/or any of the sensor 232.

As shown in FIG. 10, exemplary embodiments of the circuitry 121' can also include one or more indicators 244, such as light emitting diodes, that can be illuminated to provide a visual indication to the user. As on example, the indicators 244 can be illuminated to indicate that the circuitry 121' is powered on, a particular output language has been selected, the battery power is low, and so on. As another example, the indicators 244 can correspond to an output of the audio script such that, for example, different portions of the device illuminate when the audio script reference them and or the indicators illuminate to indicate proper or incorrect usage of the training device 10 based on feedback from one or more of the sensors 232.

In an exemplary operation, when a toggle switch 226 is actuated to select a first operation mode of the device 10, the device 10 can operate in a similar manner as described in embodiments above. In another exemplary embodiment, when the toggle switch is actuated to select a second operation mode of the device 10, the device 10 can implement a process that guide the user through the operation, use, process of using the automatic injection training device and/or performing a simulated automatic injection at least in part based on electrical signals output by one or more the sensors 232. For example, the circuitry 121' can control the audio output of the script to acknowledge a correct execution of an instruction based on an output of one or more of the sensors 232 and/or can identify an error in the execution of an instruction based on an output of one or more of the sensors 232. In some embodiments, when a user makes an error (e.g., incorrectly follows an instructions), the circuitry can be configured to keeps a record of the error, and can be configured to output more elaborate audible instructions the next time the instruction for which the error occurred is to be output.

Figure 11:
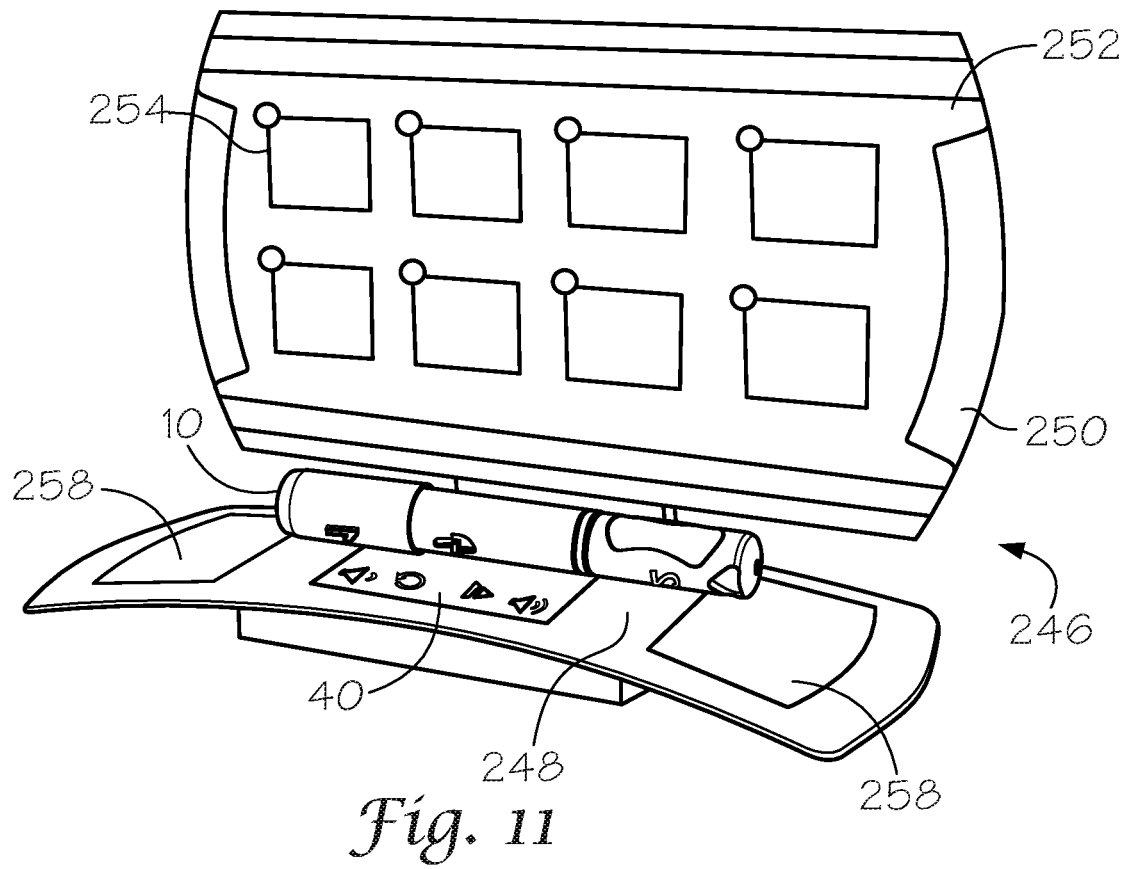
FIG. 11 illustrates another exemplary embodiment of an automatic injection training device having a corresponding base.
Figure 13:
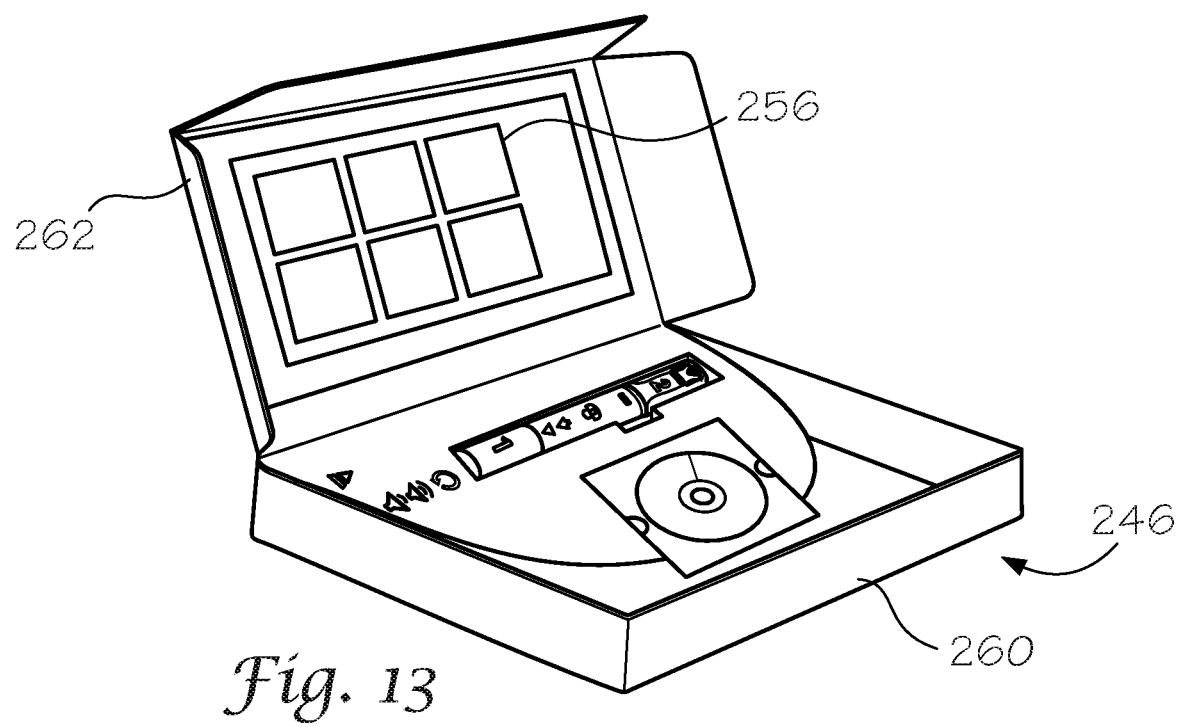
FIG. 13 illustrates another exemplary embodiment of a base that can be implemented in conjunction with embodiments of the automatic injection training device.

FIGS. 11-14 illustrate another exemplary embodiment of a device 10 having a corresponding base 246. As shown in FIG. 11, the base can provide a docking station or cradle 248 for holding or supporting the device 10 and can include a display 250 which can be implemented as display board 252 having illustrations 254 (e.g., graphics, text) providing steps of an autoinjection sequence that the user can refer to when using the device 10. In some embodiments, the base 246 can include a display unit 256 (256 shown in FIG. 14), such as a LCD display, which can display multimedia to a user corresponding to an operation of the device 10 and the automatic injection sequence (FIGS. 12-13). In some embodiments, the circuitry 121' can be disposed in the base 246 such that the circuitry 121' can be remote from the device 10. In some embodiments, the circuitry 121' can be distributed between the base 246 and the device 10 such that the circuitry in the device 10 communicates with the circuitry in the base 246.

Referring to FIGS. 11-12, the base 246 can include the control interface 40, and speaker cover portions 258, and can include the storage, processing device, control interface circuitry, and the audio circuitry. In some embodiments, the circuitry 121' can be implemented as shown in FIG. 10, where the storage, processing device, and the audio circuitry can be incorporated into the base 246, and a portion the control interface circuitry can be incorporated in the base 246 and a portion of the control interface circuitry can be incorporated in the device 10, in non-limiting embodiments.

For example, the base can include the switches of the control interface circuitry (e.g., circuitry 121 and 121') and the device 10 can include the sensors of the control interface circuitry. In some embodiments, the control interface circuitry can be included in the device 10. In some embodiments, the device 10 can be tethered to the base 246. The tether can be a cable 247, as shown in FIG. 12, which in some embodiments can be configured to electrically couple circuitry in the device 10 to circuitry in the base 246 to facilitate electrical communication between the device 10 and the base 246 (FIGS. 11-12). In some embodiments, the device 10 and the base 246 can include radio frequency (RF) transceivers and/or other devices to facilitate wireless communication between the base 246 and the device 10.

Figure 14:
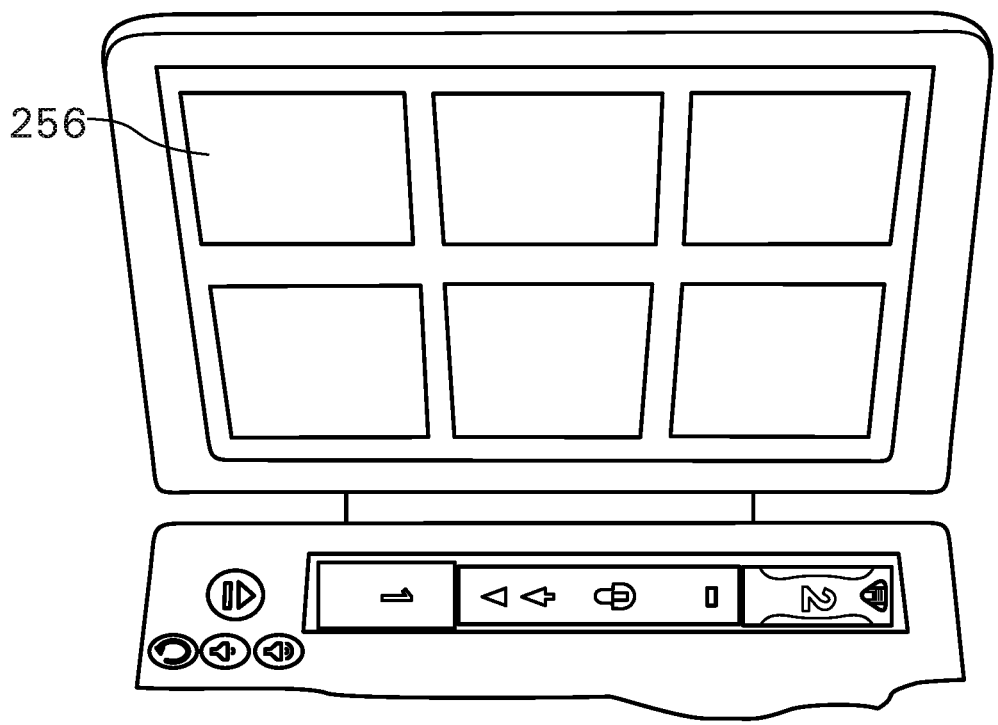
FIG. 14 illustrates an exemplary display unit that can form a portion of a base to be used in conjunction with embodiments of the automatic injection training device.
Figure 15:
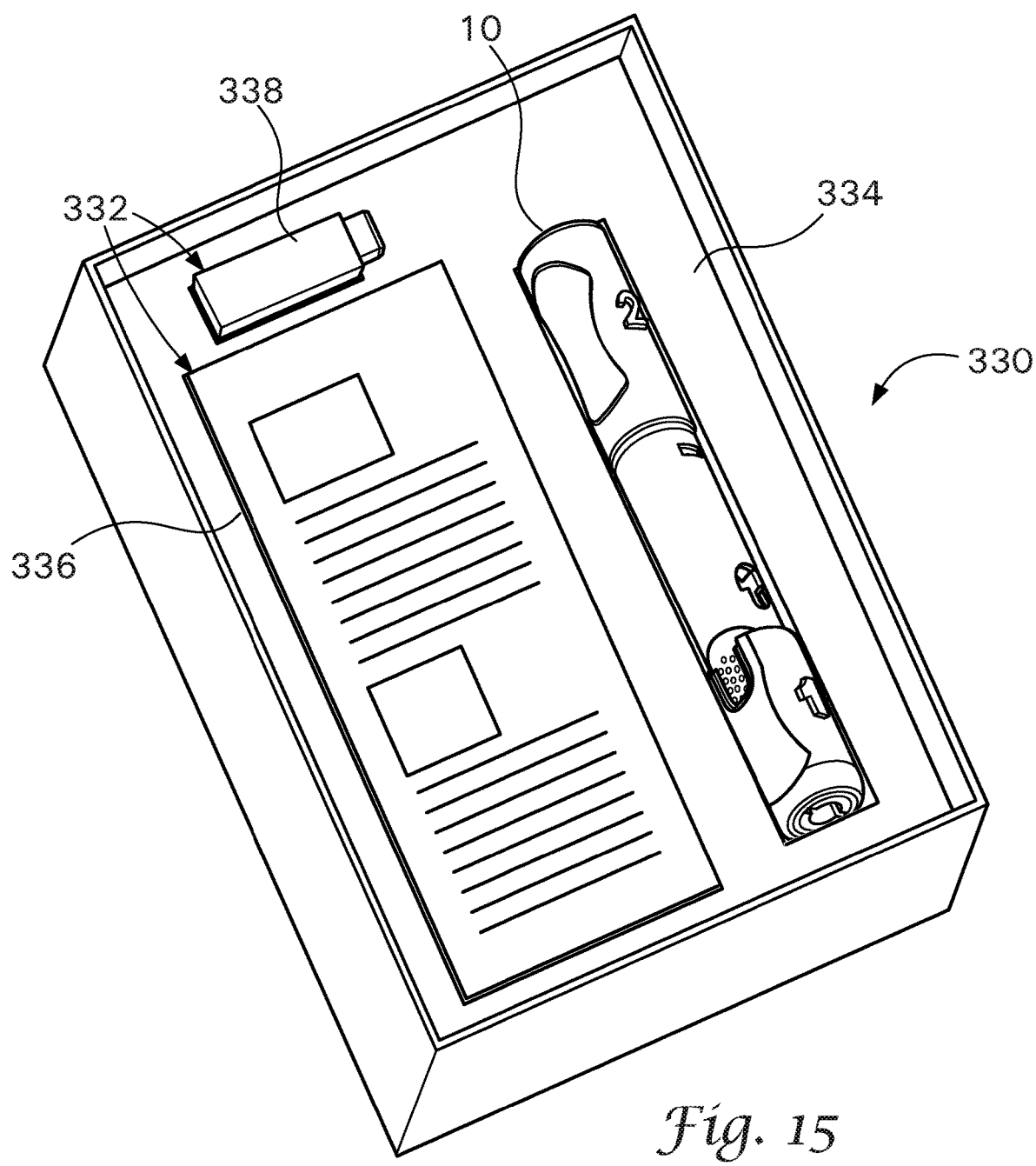
FIG. 15 is an exemplary kit or article of manufacture including an embodiment of the automatic injection training device and informational material, which can be held or stored in a container.

Referring to FIGS. 13-15, an exemplary embodiment of the base 246 can implemented as a box 260 within which the device 10 can be stored. For example, in the present embodiment at least a portion of the circuitry (e.g., circuitry 121 and 121') can be incorporated into the box 260 and the display board 252 or display unit 256 can be incorporated into the inside surface of a lid 262 of the box 260.

Exemplary embodiments of the present disclosure provide articles of manufacture or kits that include embodiments of the automatic injection training device. An article of manufacture or a kit, refers to a packaged product comprising the automatic injection device of the invention. In one exemplary embodiment, as shown in FIG. 15, a kit 330 can include an embodiment of the automatic injection device 10 and informational material 332. In one non-limiting embodiment, the informational material may be stored on a USB drive 338, for example. In exemplary embodiments, the kit 330 can include a container 334 for storing and/or transporting the automatic injection training device 10 and the informational material 332. For embodiments of an automatic injection training device used in conjunction with a base, the base can be included in the kit. The informational material 332 can include information corresponding to a description of the automatic injection training device, information to guide the user on a use of the automatic injection training device, and/or information to guide the user through an automatic injection procedure.

Figure 16:
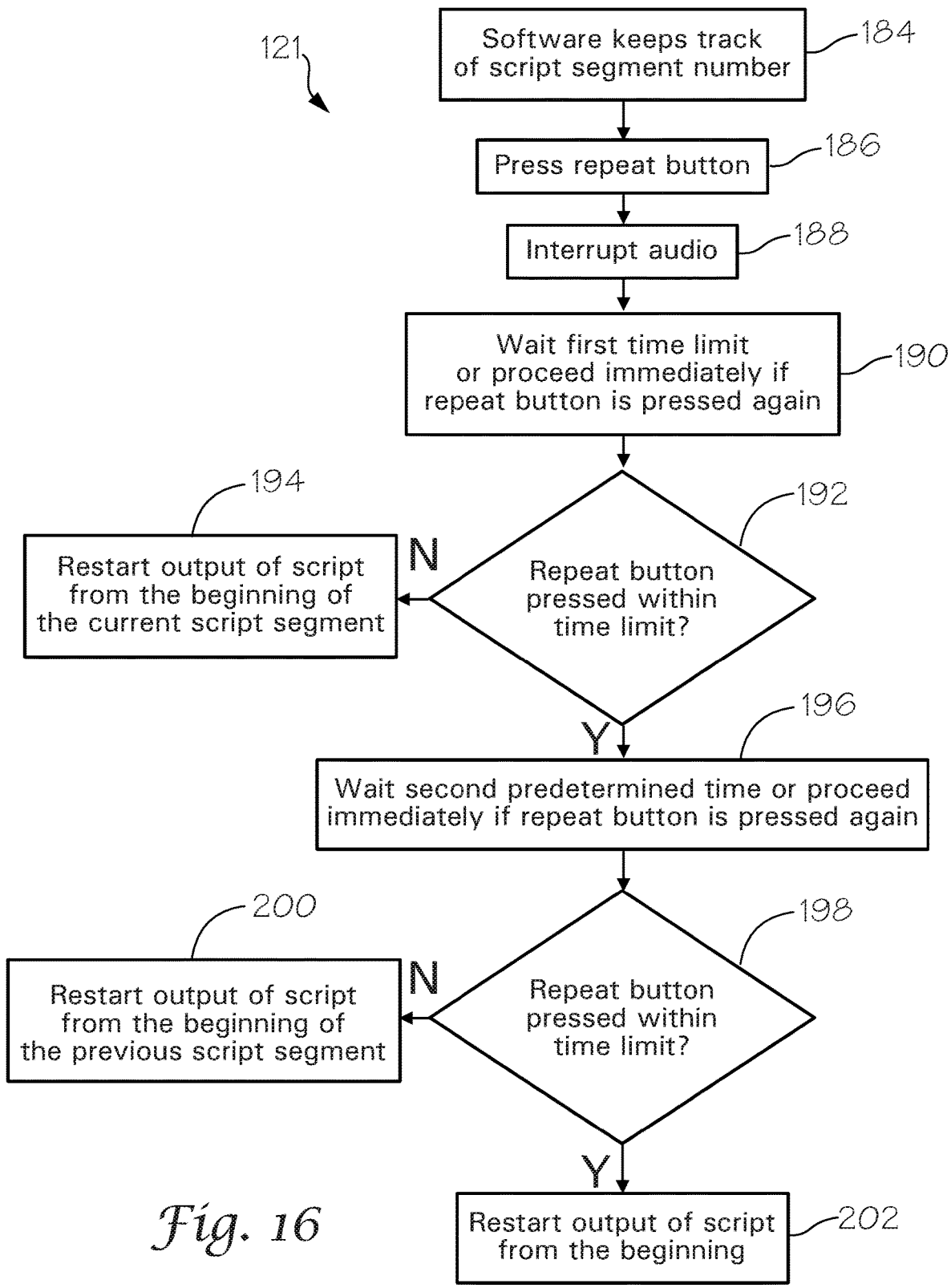
FIG. 16 is a flowchart of another exemplary operation of an embodiment of circuitry associated with a control interface of an embodiment of the automatic injection training device.

FIG. 16 is a flowchart of an exemplary operation of an embodiment of the circuitry 121. The circuitry 121 maintains a record of its current location in the script as well as which script segments of the script have already been output (184). To repeat a previously output portion of the script, the user can press a back button button to actuate the switch 128 (186) and the circuitry 121 can interrupt the output of the script (188). Subsequently, the circuitry 121 can determine whether the back button is pressed again within a time limit (190). If the button is not pressed within the time limit (192), the output of the script can be restarted from the beginning of the current script segment being output by the circuitry 121 (194). If the button is pressed within the time limit (192), the circuitry 121 can determine whether the button pressed again within another time limit (196). If not (198), the output of the scripted can be restarted from a beginning of the previous script segment output by the circuitry 121 (200). If the button is pressed within the (198), the output of the script is restarted from the beginning of the script (e.g., the beginning of the first script segment) (202).

Figure 17:
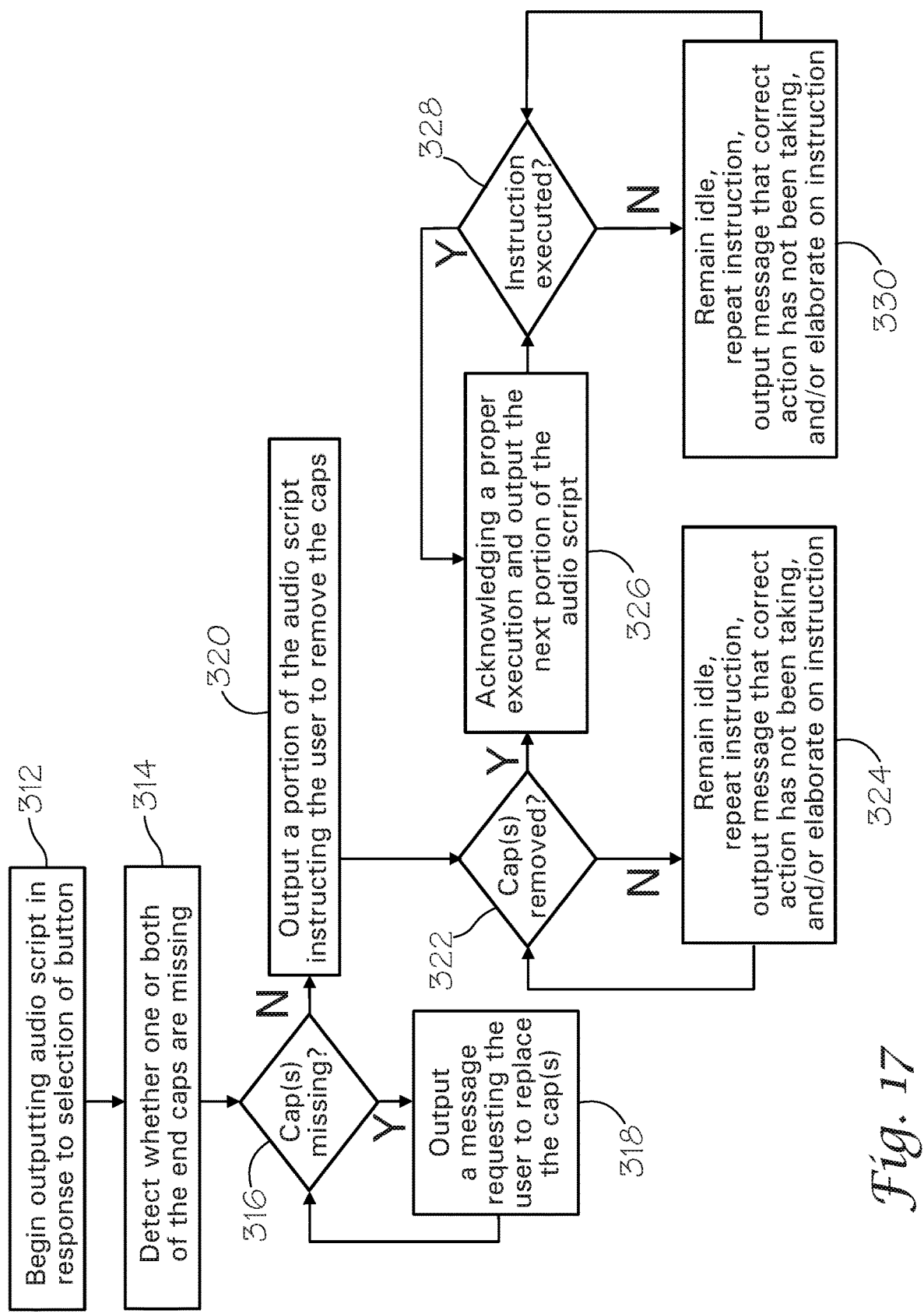
FIG. 17 is a flowchart of another exemplary operation of an embodiment of circuitry of the automatic injection training device.

FIG. 17 is a flowchart of another exemplary operation of an embodiment of circuitry of the automatic injection training device. As shown in FIG. 17, the circuitry can be configured to begin outputting the audio script in response to a selection of a button on the control interface of the device (312). The circuitry can detect whether one or both of the end caps are missing (e.g., already removed) using the sensors of the circuitry (e.g., sensors 238, 240) (314). If the one or both of the caps are missing (316), the circuitry can output a message requesting the user to replace the cap(s) (318). If the circuitry detects that the caps are present (316), the circuitry proceeds by outputting a portion of the audio script instructing the user to remove the caps (320). Using the sensors, the circuitry can determine whether the caps have been removed. If the caps have not been removed (322), the circuitry can remain idle, can repeat the instruction, and/or can elaborate on the instruction (324). Otherwise, the circuitry can output a message acknowledging a proper execution of the instruction and can output the next portion of the audio script to instruct the user to perform another task in the automatic injection sequence (326). The circuitry can detect whether the instruction has been executed. If the instruction has not been executed (328), the circuitry can remain idle, can repeat the instruction, and/or can elaborate on the instruction (324). If the instruction has been executed correctly (328), the process repeats from step 326 until the automatic injection sequence is complete.

In some embodiments, the informational material 332 can include one or more printed documents 336, typically formed by at least one substrate having ink or toner disposed thereon to form texted and/or images. For example, the informational material can include one or more pamphlets, booklets, Leaflets, labels, books, package inserts, operation manuals, instruction guides, and/or other tangible materials. The term "package insert" is used to refer to instructions customarily included in commercial packages of therapeutic products that contain information about the indications, usage, dosage, administration, contraindications and/or warnings concerning the use of such therapeutic products. In one embodiment, the package insert is a label for a therapeutic agent the injection of which is simulated using the automatic injection training device.

In some embodiments, the informational material 332 can include an electronic media device 338, such as a digital versatile disc (DVD), a CD-ROM, and/or a flash drive storing files that can be accessed via an electronic device, such as a computing device, DVD player, CD player, MP3 player, or any other suitable electronic device that allows the user to access the instructional information.

In some embodiments, the information included in the informational material can include a transcript of the audio script output by the circuitry (e.g., circuitry 121 and 121') in a printed form and/or stored in a digital form, and/or can include a copy of the audio script in stored as an audio file on an electronic media device.

In some embodiments, the information included in the informational material can include instructions on the use of the automatic injection training device in the form of text, images, audio, and/or video. The instructions can provide a guided overview of the operation of the automatic injection device and/or can include step-by-step instructions to guide the user through an automatic injection sequence. The instructions can overlap, supplement, and/or add to the information included in the audio script.

In some embodiments, the informational material can include promotional material including promotional material corresponding to products and/or services available to the user.

In some embodiments, the informational material can include one or more universal resource locators (URLs) to direct the user to one or more websites that include, supplement, overlap, and/or add to the instructional information and/or promotional information.

A visual output as disclosed herein includes but is not limited to a light, a display, a colorometric display system, a change in position of the device or any other type of visual cue to the user of the device. The visual output is associated with the device, therefore it may be disposed on the device or provided in connection with the device either by a wire or wirelessly.

An audio output as disclosed herein includes but is not limited to music, a sound, a beep, a series of beeps music or sounds, a mechanical sound including clicking, a sound replication of operation or behavior of an actual medical delivery device.

The term "connected" as used herein includes wireless or hard wire connection. The external source includes a database, a remote computer, and also includes communications with another device, a network, and any other means of communication or transfer of information known in the art. Connected may further refer to a direct surface to surface connection between the device and another surface or an indirect contact there between. In some embodiments, the device may communicate with a remote device either via a wired or a wireless connection. The remote device may be, for example, a remote communications network, a computer, a cell phone, a personal digital assistant (PDA) or the like. Such an arrangement can be used, for example, to download replacement processor-readable code from a central network to the memory module or other memory of the device. In some embodiments, the circuitry of the device can download or obtain information associated with a medicament delivery device or particular medicament, such as an expiration date, a recall notice, updated use instructions or the like.

The network interface can be configured to transmit information to and/or from the circuitry of the device to and/or from a central network, such as, for example, an emergency response network. In some embodiments, for example, the device can notify an emergency responder when and how a medicament delivery training device is used. In other embodiments, the device can transmit information to and/or from a third party, such as a physician, an emergency contact and/or the manufacturer of a medicament device, when and how the medicament delivery training device is used. Such information can include, for example, the location of use, the date and/or time of use, the efficiency of use including conditions and errors of use, or the like.

An indicator as described herein can be used to indicate to a user that a particular step or that the entire simulation is complete, or that the particular step or simulation is nearing completion. The indicator can also indicate predetermined statuses including elapsed time, and insufficient time between steps, for example. There may be one or more indicators, and each indicator may provide an indication to the user that the medicament delivery simulation is complete by an audio, visual, tactile, or a smellant (olfactory) indication, taste indicator (gustatory), or a combination thereof.

The preferred embodiment of medicament delivery training device 10 may have multiple architectures, based on space available to accommodate mechanical and electronic components. Each architecture may hold multiple sources of visual, auditory, and somatic stimuli. The two primary architectures are provided in FIGS. 9A-B. FIGS. 9A-B demonstrate that portions of the device can be provided in a separate housing, for example some components of the device can be in one housing and others can be outside the housing or in a second, third, fourth housing, etc. One skilled in the art would appreciate that some components of the device may be in one location and others in another location in light of the teachings of the disclosure herein. The term "device", therefore, as used herein includes one or more components. In a typical embodiment, the medicament delivery training device cannot deliver medicament. FIG. 9A provides a medicament delivery training device with a housing which holds the all the sources of visual, auditory, and somatic stimuli, in both mechanical and electronic format. In FIG. 9B, the sources of mechanical stimuli or feedback are separated from the sources of electronic feedback. The configuration of FIG. 9B is relevant if there is not enough room within the primary housing to hold the batteries, speaker, switches, and circuit board. As multisensory learning requires proper synchronization between the stimuli, it is important that the timing (sequence) between the mechanical and electronic components are correct. It should be borne in mind that all patents, patent applications, patent publications, technical publications, scientific publications, and other references referenced herein are hereby incorporated by reference in this application in order to more fully describe the state of the art to which the present invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A medicament delivery training device comprising:
    a housing having an actuation member to simulate delivery of medicament from the device, the device comprising a pre-delivery state and a post-delivery state;
    a control interface disposed on the device, the control interface comprising at least one responsive member reactive to a user input;
    a signal output component disposed on the device;
    circuitry integrated into the device configured so as to control a provision of stepwise instructions for operation of the device to guide a user through the operation in a particular sequence;
    a sensor to detect a condition of the device;
    a first program code module that records a condition of the device;
    a second program code module that records and/or tracks trending results of the performance of the device and/or the user, or efficiency of the user and/or of the device; or both;
    a memory module, wherein the memory module stores conditions of the device in the sequence; and
        a medicament delivery simulation mechanism disposed within the delivery training device, the medicament delivery simulation mechanism having a first position when the device is in the pre-delivery state and a second position when the device is in the post-delivery state, and wherein the medicament delivery simulation mechanism is associated with the actuation member such that when the actuation member is actuated, the medicament delivery simulation mechanism is urged from the first position to the second position, and wherein the medicament delivery simulation mechanism can be mechanically reset from the second position to the first position for reuse of the medicament delivery training device.

2. The medicament delivery training device of claim 1, wherein an output of the device from the signal output component is initiated in response to a predetermined value detected for a condition.

3. The medicament delivery training device of claim 1, wherein an output of the device from the signal output component is initiated in response to a predetermined elapsed time value occurring within the particular sequence of stepwise instructions.

4. The medicament delivery training device of claim 3, wherein the predetermined elapsed time value period comprises a pause between the steps of the stepwise instructions.

5. The medicament delivery training device of claim 1, wherein the output of the device from the signal output component is initiated when the user performs one or more steps in the particular sequence within a predetermined time period.

6. The medicament delivery training device of claim 1, wherein the condition is an error condition.

7. The medicament delivery training device of claim 6, wherein the error condition comprises an operation detected out of sequence.

8. The medicament delivery training device of claim 6, wherein the error condition is a failure to detect a step in the use of the sequence.

9. The medicament delivery training device of claim 6, wherein the error condition is a failure by the user to use the device to perform one or more steps in the particular sequence within a predetermined time period.

10. The medicament delivery training device of claim 1, further comprising an actuation member, and the medicament delivery simulation mechanism comprising a spring mechanism, such that in the pre-delivery state, the mechanism is in a retracted position, and in the post-delivery state, the mechanism is in a protracted position, and actuation of the actuation member urges the mechanism from the retracted position to the protracted position.

11. The medicament delivery training device of claim 10, wherein the mechanism is mechanically resettable from the protracted position to the retracted position.

12. The medicament delivery training device of claim 1, further comprising a third program code module to record usage of the device over a predetermined time and to output information to the user about an amount of training or accuracy of usage.

13. The medicament delivery training device of claim 1, further comprising a fourth program code module that causes the circuitry to transfer recorded information via a wire or wireless connection to a network, a computer or to another device.

14. A medicament delivery training device comprising:
    a housing having an actuation member to simulate delivery of a medicament from the device, wherein the device comprises a pre-delivery state and a post-delivery state;
    a control interface disposed on the device, the control interface comprising at least one responsive member reactive to a user input;
    a signal output component disposed on the device;
    circuitry integrated into the device configured so as to control a provision of stepwise instructions provided to a user for operation of the device to guide the user through the operation in a particular sequence;

a memory module in the device programmed to record usage of the device over a predetermined time and to output information to the user about an amount of training or accuracy of usage; and a medicament delivery simulation mechanism disposed within the delivery training device, the medicament delivery simulation mechanism having a first position when the device is in the pre-delivery state and a second position when the device is in the post-delivery state, and wherein the medicament delivery simulation mechanism is associated with the actuation member such that when the actuation member is actuated, the medicament delivery simulation mechanism is urged from the first position to the second position, and wherein the medicament delivery simulation mechanism can be mechanically reset from the second position to the first position for reuse of the medicament delivery training device.

15. The medicament delivery training device of claim 14, wherein a signal output of the device is initiated in relation to the condition of the device and a predetermined condition of the device at a step in the sequence.

16. The medicament delivery training device of claim 14, wherein the memory module records error conditions, and wherein the memory module identifies and stores error conditions of the device in the sequence.

17. The medicament delivery training device of claim 16, wherein when the user reaches a step in which an error was made by the user in a previous training, an output of the device is initiated to alert the user to the previous error made in the step.

18. The medicament delivery training device of claim 14, wherein the device provides trending results based on the recorded use of the device by the user.

19. The medicament delivery training device of claim 14, wherein when the medicament delivery simulation mechanism is reset from the second position to the first position, and the training device is reset from the post-delivery state to the pre-delivery state, visual, auditory, or tactile feedback of the medicament delivery simulation mechanism, or any combination thereof, is reconstituted for a subsequent training.

20. The medicament delivery training device of claim 14, wherein when the medicament delivery training device changes from a pre-delivery state to a post-delivery state, tactile feedback, visual feedback, gustatory feedback, olfactory feedback, or auditory feedback, or any combination thereof, of the training device mimics the tactile, visual gustatory feedback, olfactory feedback, and auditory feedback of an actual medicament delivery device.

21. The medicament delivery training device of claim 20, wherein the tactile, visual, gustatory, olfactory, and/or auditory feedback of the training device are output in conjunction with one another to simulate the tactile, visual, gustatory, olfactory, and/or auditory feedback of a medicament delivery device.

22. The medicament delivery training device of claim 14, wherein the device outputs information about quality of training, areas of improvement, and/or positive feedback about areas where the user has complied with the use of the device.

* * * * *